United States Patent
Niwa

(10) Patent No.: US 12,164,077 B2
(45) Date of Patent: Dec. 10, 2024

(54) SENSING SYSTEM AND SIGNAL PROCESSING APPARATUS

(71) Applicant: SONY SEMICONDUCTOR SOLUTIONS CORPORATION, Kanagawa (JP)

(72) Inventor: Atsumi Niwa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/263,565

(22) PCT Filed: Dec. 23, 2021

(86) PCT No.: PCT/JP2021/047893
§ 371 (c)(1),
(2) Date: Jul. 31, 2023

(87) PCT Pub. No.: WO2022/172621
PCT Pub. Date: Aug. 18, 2022

(65) Prior Publication Data
US 2024/0027645 A1 Jan. 25, 2024

(30) Foreign Application Priority Data
Feb. 9, 2021 (JP) .................. 2021-019025

(51) Int. Cl.
*G01V 8/20* (2006.01)
*G01J 1/44* (2006.01)
(Continued)

(52) U.S. Cl.
CPC .............. *G01V 8/20* (2013.01); *G01J 1/44* (2013.01); *H04N 25/11* (2023.01); *H04N 25/47* (2023.01);
(Continued)

(58) Field of Classification Search
CPC ........ G01V 8/20; G01J 1/44; G01J 2001/446; G01J 2001/448; H04N 25/11;
(Continued)

(56) References Cited

U.S. PATENT DOCUMENTS 10,133,334 B2 * 11/2018 Liu ................. G06F 1/3262
11,908,119 B2 * 2/2024 Aoki ................ H04N 23/951
(Continued)

FOREIGN PATENT DOCUMENTS

| JP | 2019-195135 A | 11/2019 |
|---|---|---|
| WO | 2017/013806 A1 | 1/2017 |

OTHER PUBLICATIONS

International Search Report and Written Opinion of PCT Application No. PCT/JP2021/047893, issued on Feb. 15, 2022, 08 pages of ISRWO.

*Primary Examiner* — Seung C Sohn
(74) *Attorney, Agent, or Firm* — CHIP LAW GROUP

(57) ABSTRACT

A sensing system includes a light emission control unit that controls light emission of a light source by using a light emission pattern determined in advance, a pixel array unit in which pixels that detect a change in a received light amount as an event and generate an event signal indicating presence or absence of detection of the event are two-dimensionally arranged, and a signal corrector that performs correction of the event signal on the basis of the light emission pattern.

18 Claims, 17 Drawing Sheets

(51) Int. Cl.
*H04N 25/11* (2023.01)
*H04N 25/47* (2023.01)
*H04N 25/702* (2023.01)
*H04N 25/707* (2023.01)

(52) U.S. Cl.
CPC ......... *H04N 25/702* (2023.01); *H04N 25/707* (2023.01); *G01J 2001/446* (2013.01); *G01J 2001/448* (2013.01)

(58) Field of Classification Search
CPC .... H04N 25/47; H04N 25/702; H04N 25/707; H04N 25/60; H04N 25/63; G01S 17/04
See application file for complete search history.

(56) References Cited

U.S. PATENT DOCUMENTS

| | | |
|---|---|---|
| 2014/0085621 A1 | 3/2014 | Lee et al. |
| 2019/0132537 A1 | 5/2019 | Webster |

* cited by examiner

SENSING SYSTEM AND SIGNAL PROCESSING APPARATUS

CROSS REFERENCE TO RELATED APPLICATIONS

This application is a U.S. National Phase of International Patent Application No. PCT/JP2021/047893 filed on Dec. 23, 2021, which claims priority benefit of Japanese Patent Application No. JP 2021-019025 filed in the Japan Patent Office on Feb. 9, 2021. Each of the above-referenced applications is hereby incorporated herein by reference in its entirety.

TECHNICAL FIELD

The present technology relates to a sensing system and a signal processing apparatus that achieve noise reduction of reflected light obtained by reflection of irradiation light from a subject.

BACKGROUND ART

Reflected light of a subject based on an irradiation light emitted from a light source is received by a pixel array unit in a state where noise and the like are included. In the case of an event-based vision sensor (EVS) in which the pixel array unit detects a change in a received light amount and outputs an event signal, an event not to be originally detected is detected due to noise in some cases.

In order to prevent such erroneous detection, Patent Document 1 below discloses a technology of a proximity sensor that distinguishes noise by confirming a peak detection timing of a waveform obtained by a sensor.

CITATION LIST

Patent Document

Patent Document 1: US Patent Application Publication No. 2014/0085621 Specification

SUMMARY OF THE INVENTION

Problems to be Solved by the Invention

However, there is a problem that detection performance as a proximity sensor cannot be sufficiently obtained only by using a simple histogram.

The present technology has been made in view of the above circumstances, and an object of the present technology is to improve event detection performance by improving noise removal performance.

Solutions to Problems

A sensing system of the present technology includes a light emission control unit that controls light emission of a light source by using a light emission pattern determined in advance, a pixel array unit in which pixels that detect a change in a received light amount as an event and generate an event signal indicating presence or absence of detection of the event are two-dimensionally arranged, and a signal corrector that performs correction of the event signal on the basis of the light emission pattern.

The light source emits light in a predetermined light emission pattern, and thus, reflected light and noise reflected by a subject can be distinguished for each pixel.

The sensing system described above may further include a determiner that determines presence or absence of occurrence of the event on the basis of the event signal, a counter that counts a number of the pixels for which the determiner determines that the event has occurred as an event occurrence pixel number, and a correlation estimator that estimates a correlation between the light emission pattern and the received light amount on the basis of the event occurrence pixel number.

By estimating the correlation between the predetermined light emission pattern and the received light amount, it is possible to determine whether or not the received light is the reflected light of light emitted from the light source.

In the sensing system described above, the correlation estimator may estimate the correlation on the basis of a pixel number integral value obtained by integrating the event occurrence pixel number.

The event signal output from the pixels is a signal that captures a change in the received light amount.

The sensing system described above may further include an edge detector that detects an edge of the light emission pattern on the basis of a temporary varying waveform of the event occurrence pixel number, in which the correlation estimator estimates the correlation on the basis of the edge having been detected.

By detecting the edge corresponding to the light emission pattern, it is not necessary to perform integration or the like of the event occurrence pixel number.

In the sensing system described above, the pixels may be configured to generate, as the event signal, a first polarity event signal indicating a change in the received light amount on an increasing side and a second polarity event signal indicating a change in the received light amount on a decreasing side, the determiner may determine presence or absence of occurrence of a first event on the basis of the first polarity event signal and determine presence or absence of occurrence of a second event on the basis of the second polarity event signal, and the signal corrector may perform the correction of the first polarity event signal and the second polarity event signal.

Since both the first polarity event signal and the second polarity event signal can be generated, for example, the occurrence of the first polarity event corresponding to the rising edge in the predetermined light emission pattern and the occurrence of the second polarity event corresponding to the falling edge in the predetermined light emission pattern can be detected.

In the sensing system described above, the counter may count a number of the pixels for which the determiner determines that the first event has occurred as the first event occurrence pixel number, and count a number of the pixels for which the determiner determines that the second event has occurred as the second event occurrence pixel number, the correlation estimator may estimate the correlation by associating a rising edge in the light emission pattern with the first event occurrence pixel number and associating a falling edge in the light emission pattern with the second event occurrence pixel number, and the signal corrector may perform the correction on the second event detected in a first period in which the first event occurrence pixel number corresponding to the rising edge is counted and the first event detected in a second period in which the second event occurrence pixel number corresponding to the falling edge is counted.

By associating the first event occurrence pixel number corresponding to the rising edge in the light emission pattern with the second event occurrence pixel number corresponding to the falling edge in the light emission pattern, it is possible to calculate the correlation between the light emission pattern and the received light amount of light received by the pixel array unit on the basis of a timing of occurrence of each event or the like.

The sensing system described above may further include a notification output unit that performs an output for providing notification that there is no correlation in a case where the correlation estimated by the correlation estimator indicates that there is no correlation.

For example, the notification by the notification output unit is transmitted to a processor in the subsequent stage.

In the sensing system described above, the light emission control unit may control the light emission by using a different light emission pattern for every one of a plurality of wavelengths.

For example, the light source can emit light of various wavelengths.

In the sensing system described above, the pixel array unit may be provided with a plurality of types of the pixels corresponding to every one of the plurality of wavelengths, the sensing system may include a determiner that determines the presence or absence of occurrence of the event for the pixels corresponding to specific wavelengths on the basis of the event signal generated by the pixels corresponding to the specific wavelengths, a counter that counts the number of the pixels for which the determiner determines that the event has occurred as an event occurrence pixel number for the pixels corresponding to the specific wavelengths, and a correlation estimator that calculates a correlation between the light emission pattern and the event occurrence pixel number for every one of the specific wavelengths, and the signal corrector may correct the event signal generated by the pixels corresponding to the specific wavelengths on the basis of the light emission pattern and the correlation corresponding to the specific wavelength.

By providing the pixels corresponding to the plurality of wavelengths, the presence or absence of occurrence of the event is determined for every one of the wavelengths, and the event occurrence pixel number is counted.

In the sensing system described above, each of the plurality of wavelengths may include a wavelength for visible light having a different color.

The specific wavelength is, for example, 700 nm for red light, 525 nm for green light, or 470 nm for blue light.

In the sensing system described above, each of the pixels may include a color filter and have sensitivity to one of the plurality of wavelengths.

Thus, a pixel having a general configuration can be used.

The sensing system described above may further include a first pixel as the pixel, a second pixel that is different from the first pixel and generates a gradation signal representing intensity of a received light amount, and a signal processor that performs signal processing by using the gradation signal generated in the second pixel and a corrected event signal obtained by correcting the event signal generated in the first pixel by the signal corrector.

Various signal processors are conceivable. For example, a signal processor that generates a color image on the basis of the gradation signal and performs processing of correcting the color image by using the corrected event signal is also an example.

In the sensing system described above, the first pixel and the second pixel may be disposed on the same sensor chip.

As a result, more space can be saved than in a case where a plurality of sensor chips is configured.

In the sensing system described above, a pixel having sensitivity to red light, a pixel having sensitivity to green light, and a pixel having sensitivity to blue light may be provided as the second pixel.

As a result, a gradation signal for every color is generated in each of the second pixels.

In the sensing system described above, the first pixel may be disposed in place of some of the pixels having sensitivity to green light in a Bayer array.

As a result, the first pixel and the three types of second pixels are disposed in one pixel array unit.

The sensing system described above may further include a light reception control unit that performs light reception control in the pixel array unit in accordance with the light emission pattern.

For example, in a case where a non-light emission state of the light source continues for a predetermined time, the reflected light according to the light emission pattern of the light source is not received. In such a case, even if an event is detected, there is a high possibility that only an event generated by noise can be detected.

In the sensing system described above, the light reception control unit may perform the light reception control so that the event is not detected in the pixel array unit in a case where there is no change in a light emission state of the light source.

Not only in a case where the non-light emission state of the light source continues for a predetermined time, but also in a case where the light emission state continues for a predetermined time, the received light amount of the reflected light does not change in accordance with the light emission pattern of the light source.

A signal processing apparatus of the present technology includes a determiner that determines presence or absence of an event on the basis of an event signal output from a pixel as a signal indicating whether or not a change in a received light amount has been detected as the event, a counter that counts a number of the pixels for which the determiner determines that the event has occurred as an event occurrence pixel number, a correlation estimator that estimates a correlation between a light emission pattern determined in advance and the received light amount in a light source on the basis of the event occurrence pixel number, and a signal corrector that corrects the event signal on the basis of the correlation having been estimated and the light emission pattern.

With such a signal processing apparatus, the above-described various functions can be obtained.

MODE FOR CARRYING OUT THE INVENTION

Hereinafter, embodiments of the present technology will be described in the following order with reference to the accompanying drawings.
<1. First embodiment>
 <1-1. Configuration of sensing system>
 <1-2. Configuration of pixel array unit>
 <1-3. Detection of reflected light based on light emission pattern>
 <1-4. Noise removal in target period>
<2. Second embodiment>
<3. Third embodiment>
<4. Fourth embodiment>
<5. Fifth embodiment>
<6. Flowchart>
<7. Modifications>
<8. Summary>
<9. Present technology>

Various embodiments of a sensing system 1 will be described.

1. First Embodiment

<1-1. Configuration of Sensing System>

Figure 1:
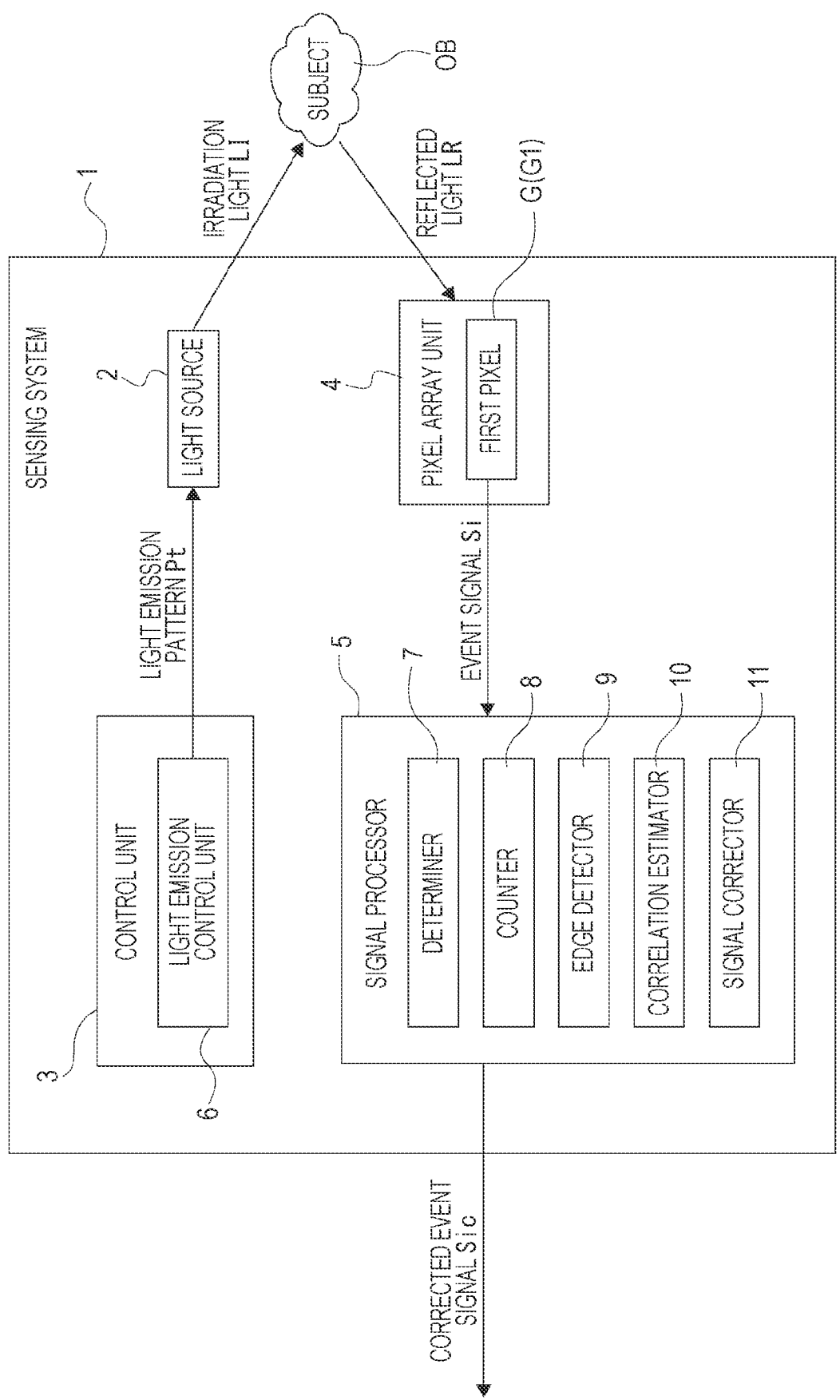
FIG. 1 is a block diagram illustrating a configuration example of a sensing system according to the present technology.

As illustrated in FIG. 1, the sensing system 1 according to a first embodiment includes a light source 2, a control unit 3, a pixel array unit 4, and a signal processor 5.

The light source 2 can emit specific light toward a subject OB located outside the sensing system 1. The specific light may be visible or invisible. In the first embodiment, infrared (IR) light which is invisible light is taken as an example.

Note that the light emitted from the light source 2 toward the outside of the sensing system 1 is referred to as "irradiation light LI".

The control unit 3 includes a light emission control unit 6 that controls light emission of the light source 2. Specifically, as will be described later, the light emission control unit 6 controls light emission of the light source 2 by a predetermined light emission pattern Pt.

The pixel array unit 4 includes a plurality of pixels G that receives light obtained by reflecting the irradiation light LI by the subject OB. The light incident on the pixel G after the irradiation light LI is reflected by the subject OB is referred to as "reflected light LR".

The pixel G included in the pixel array unit 4 has sensitivity to the IR light. Furthermore, the pixel G detects, as an event, a change in a received light amount of the received IR light, and generates an event signal Si indicating the presence or absence of the event. The generated event signal Si is output to the signal processor 5 in the subsequent stage.

That is, the pixel array unit 4 functions as a so-called event-based vision sensor (EVS).

In the following description, the pixel G that detects an event and generates the event signal Si in order to achieve the function as EVS will be referred to as a "first pixel G1".

The event signal Si output from the first pixel G1 is, for example, either an ON signal (H signal) indicating that an event has occurred or an OFF signal (L signal) indicating that no event has occurred.

The signal processor 5 performs various signal processing on the basis of the event signal Si output from each first pixel G1 of the pixel array unit 4.

The signal processor 5 includes a determiner 7, a counter 8, an edge detector 9, a correlation estimator 10, and a signal corrector 11.

The determiner 7 performs processing of determining whether or not an event has been detected on the basis of the event signal Si.

The counter 8 performs processing of counting the number of first pixels G1 in which an event is detected as an event occurrence pixel number Neg.

The edge detector 9 detects a rising edge and a falling edge of the light emission pattern Pt on the basis of a change in the received light amount.

The correlation estimator 10 performs processing for determining whether or not the event signal Si is an event caused by receiving the reflected light LR. For example, the light emission control unit 6 performs processing of estimating a correlation between the light emission pattern Pt provided to the light source 2 and the received light amount in the first pixel G1. Alternatively, the correlation between the light emission pattern Pt and the received light amount of the entire pixel array unit 4 may be estimated. Furthermore, a correlation may be estimated by comparing the light emission pattern Pt with a timing when the event occurrence pixel number Neg is large.

Each of these examples will be described later again.

The signal corrector 11 corrects the event signal Si in accordance with information regarding the correlation estimated by the correlation estimator 10 and outputs the corrected event signal Si as a corrected event signal Sic. The corrected event signal Sic is supplied to the outside of the sensing system 1, for example. A device or a system outside the sensing system 1 can perform various processing by using the corrected event signal Sic. These examples will be described in other embodiments.

The signal corrector 11 uses correlation information to determine whether the event signal Si is based on an event detected in accordance with reception of the reflected light LR or on an event detected by noise. Then, in a case where it is determined that the event signal is the event signal Si output by the event detected by the noise, processing of correcting the event signal Si is performed.

As the correction of the event signal Si, for example, processing of correcting the event signal Si output as the ON signal (H signal) to the OFF signal (L signal) may be performed, or processing of outputting information for instructing a processor in the subsequent stage to treat the event signal Si as the OFF signal may be performed.

Details of each component included in the signal processor 5 will be described later.

<1-2. Configuration of Pixel Array Unit>

A configuration example of the pixel array unit 4 will be described.

Figure 2:
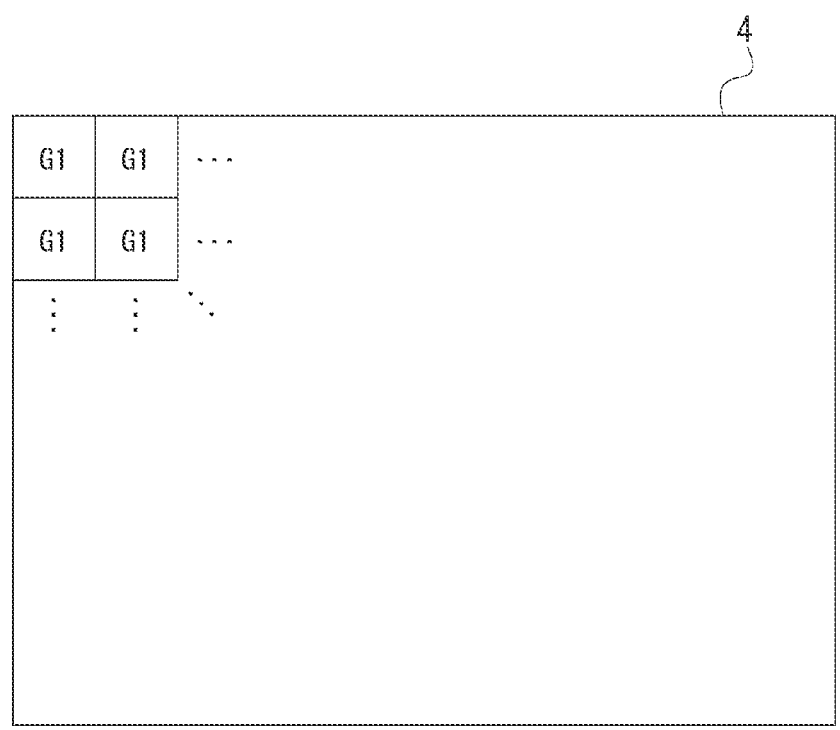
FIG. 2 is a schematic diagram illustrating a configuration example of a pixel array unit.

As illustrated in FIG. 2, the pixel array unit 4 is formed by two-dimensionally arranging the first pixels G1 in a matrix.

Each of the first pixels G1 has a single photodiode PD, and can generate the event signal Si by using electric charge obtained by the photodiode PD.

Figure 3:
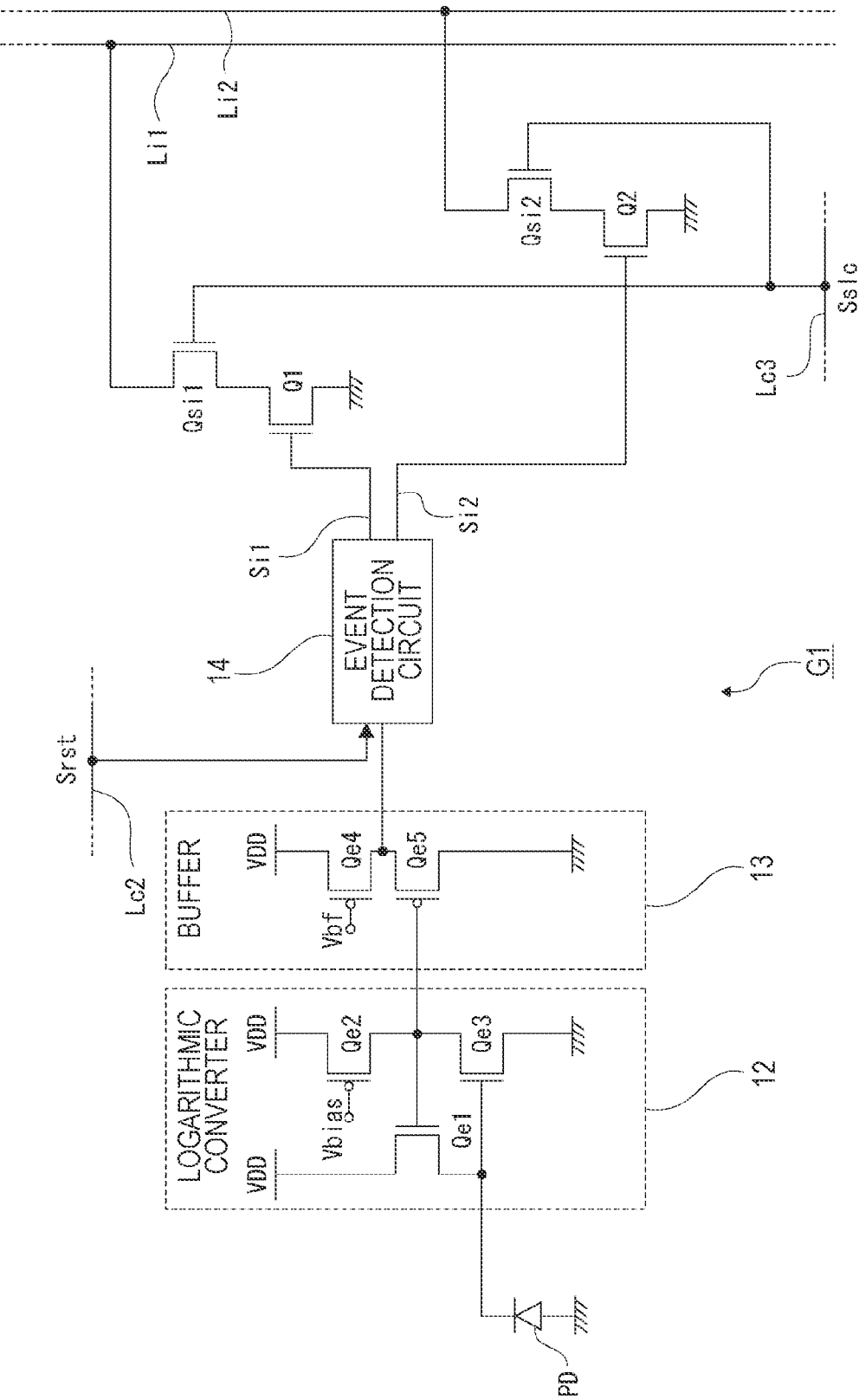
FIG. 3 is an equivalent circuit diagram of a first pixel.

FIG. 3 is an equivalent circuit diagram of the first pixel G1.

As illustrated in the drawing, the first pixel G1 includes the photodiode PD as a photoelectric conversion element.

The first pixel G1 includes an event transfer transistor Qti (not shown), a logarithmic converter 12, a buffer 13, an event detection circuit 14, a transistor Q1, a first event selection transistor Qsi1, a transistor Q2, and a second event selection transistor Qsi2 as a configuration related to generation and reading of the event signal Si.

Here, in this example, the various transistors included in the first pixel G1 include, for example, metal-oxide-semiconductor field-effect transistors (MOSFETs).

As for the first pixel G1, a row control line is wired along a row direction in every pixel row, and an event vertical signal line is wired along a column direction in each pixel column. Specifically, a row control line Lc2 for transmitting a reference level reset signal Srst and a row control line Lc3 for transmitting an event selection signal Sslc are wired.

The logarithmic converter 12 converts a photocurrent (current according to the received light amount) obtained by the photodiode PD into a logarithmic voltage signal.

The buffer 13 corrects the voltage signal input from the logarithmic converter 12 and outputs the corrected voltage signal to the event detection circuit 14.

As illustrated in the drawing, the logarithmic converter 12 includes a transistor Qe1, a transistor Qe2, and a transistor Qe3. In this example, the transistor Qe1 and the transistor Qe3 are N-type transistors, and the transistor Qe2 is a P-type transistor.

The source of the transistor Qe1 is connected to the cathode of the photodiode PD via the event transfer transistor Qti and the drain of the transistor Qe1 is connected to a power supply terminal (reference potential VDD).

The transistor Qe2 and the transistor Qe3 are connected in series between the power supply terminal and a ground terminal. Furthermore, a connection point between the transistor Qe2 and the transistor Qe3 is connected to the gate of the transistor Qe1 and an input terminal of the buffer 13 (the gate of a transistor Qe5 to be described later). In addition, a predetermined bias voltage Vbias is applied to the gate of the transistor Qe2.

The drains of the transistor Qe1 and the transistor Qe3 are connected to a power supply side (reference potential VDD) to form a source follower circuit. The photocurrent from the photodiode PD is converted into a logarithmic voltage signal by these two source followers connected in a loop shape. In addition, the transistor Qe2 supplies a constant current to the transistor Qe3.

The buffer 13 includes a transistor Qe4 and a transistor Qe5 which are P-type transistors, and the transistors Qe4 and Qe5 are connected in series between the power supply terminal and the ground terminal.

A connection point between the transistor Qe4 and the transistor Qe5 is used as an output terminal of the buffer 13, and a corrected voltage signal is output from the output terminal to the event detection circuit 14 as a light reception signal.

The event detection circuit 14 detects a change in the received light amount as an event by setting the past level of the light reception signal as a reference level Lref and obtaining a difference between the reference level Lref and the current level of the light reception signal. Specifically, the event detection circuit 14 detects the presence or absence of an event on the basis of whether or not the level (absolute value) of a difference signal representing the difference between the reference level Lref and the current level of the light reception signal is equal to or larger than a predetermined threshold value.

The event detection circuit 14 of this example is configured to be able to separately detect an event in which the received light amount changes to an increasing side, that is, an event in which the difference from the reference level Lref becomes positive (hereinafter referred to as a "first polarity event") and an event in which the received light amount changes to a decreasing side, that is, an event in which the difference from the reference level Lref becomes negative (hereinafter referred to as a "second polarity event").

The event detection circuit 14 outputs a signal indicating a detection result of the first polarity event as a first polarity event signal Si1, and outputs a signal indicating a detection result of the second polarity event as a second polarity event signal Si2.

Here, the event detection circuit 14 resets the reference level Lref to the current level of the light reception signal on the basis of the reference level reset signal Srst input via the row control line Lc2.

By resetting the reference level Lref in such a manner, it is possible to detect a new event on the basis of a change in the level of the light reception signal from the time point at which the reset is performed. That is, the resetting of the reference level Lref functions as processing for controlling the event detection circuit 14 to a state in which a new event can be detected.

Note that an internal circuit configuration example of the event detection circuit 14 will be described again.

The transistor Q1, the first event selection transistor Qsi1, the transistor Q2, and the second event selection transistor Qsi2 function as selection output circuits for the first polarity event signal Si1 and the second polarity event signal Si2, respectively.

Here, in this example, since the first polarity event signal Si1 and the second polarity event signal Si2 are detected as event signals, a first event vertical signal line Li1 and a second event vertical signal line Li2 are provided as the event vertical signal line.

As illustrated in the drawing, the transistor Q1 and the first event selection transistor Qsi1 are connected in series between the first event vertical signal line Li1 and the ground terminal, and the first polarity event signal Si1 is supplied to the gate of the transistor Q1.

Furthermore, the transistor Q2 and the second event selection transistor Qsi2 are connected in series between the second event vertical signal line Li2 and the ground terminal, and the second polarity event signal Si2 is supplied to the gate of the transistor Q2.

The gate of the first event selection transistor Qsi1 and the gate of the second event selection transistor Qsi2 are connected to the row control line Lc3, respectively.

The first event selection transistor Qsi1 is brought into conduction when the event selection signal Sslc supplied from the row control line Lc3 to the gate is turned on, and outputs the first polarity event signal Si1 to the first event vertical signal line Li1.

The second event selection transistor Qsi2 is brought into conduction when the event selection signal Sslc supplied from the row control line Lc3 to the gate is turned on, and outputs the second polarity event signal Si2 to the second event vertical signal line Li2.

In the first pixel G1, a light reception signal according to accumulated charge of the photodiode PD is input to the event detection circuit 14, and the first polarity event signal Si1 and the second polarity event signal Si2 are generated. When the first polarity event signal Si1 and the second polarity event signal Si2 are read, the event selection signal Sslc is turned on, and the first polarity event signal Si1 and the second polarity event signal Si2 are output to the first event vertical signal line Li1 and the second event vertical signal line Li2, respectively.

Figure 4:
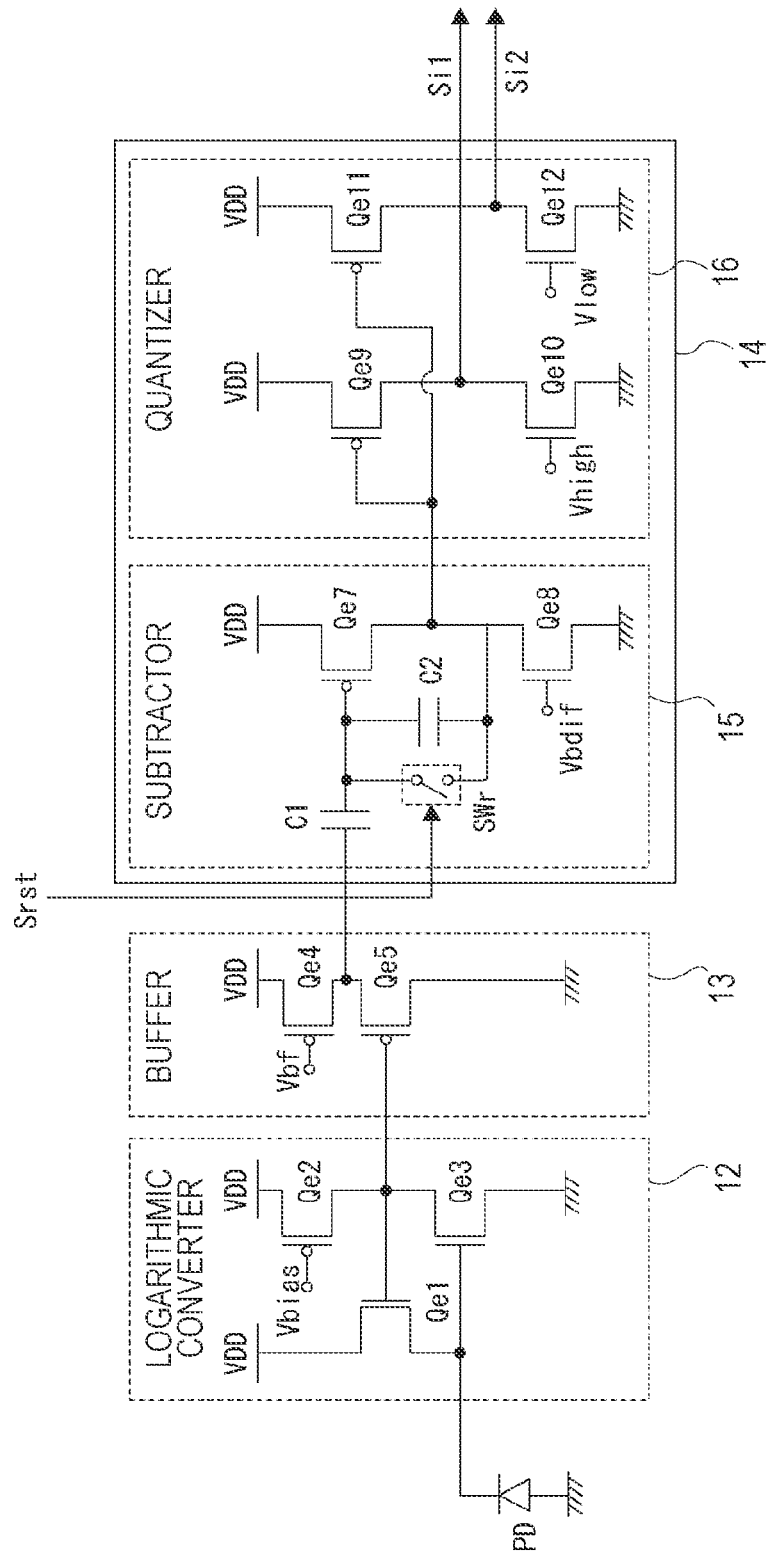
FIG. 4 is a diagram illustrating an internal configuration example of an event detection circuit.

FIG. 4 is an explanatory diagram of an internal configuration example of the event detection circuit 14, and illustrates the photodiode PD, the logarithmic converter 12, and the buffer 13 together with the internal circuit configuration example of the event detection circuit 14.

As illustrated in the drawing, the event detection circuit 14 includes a subtractor 15 and a quantizer 16.

The subtractor 15 reduces the level of the light reception signal (voltage signal) from the buffer 13 in accordance with the reference level reset signal Srst. The subtractor 15 outputs the reduced light reception signal to the quantizer 16.

The quantizer 16 quantizes the light reception signal from the subtractor 15 into a digital signal and outputs the digital signal as an event signal (in this example, the first polarity event signal Si1 and the second polarity event signal Si2).

The subtractor 15 includes a capacitor C1 and a capacitor C2, a transistor Qe7 and a transistor Qe8, and a reset switch SWr. The transistor Qe7 is a P-type transistor, and the transistor Qe8 is an N-type transistor.

The transistor Qe7 and the transistor Qe8 are connected in series between the power supply terminal and the ground terminal to form an inverter. Specifically, the source of the transistor Qe7 is connected to the power supply terminal, the drain of the transistor Qe7 is connected to the drain of the transistor Qe8, and the source of the transistor Qe8 is connected to the ground terminal. Note that a voltage Vbdif is applied to the gate of the transistor Qe8.

The capacitor C1 has one end connected to the output terminal of the buffer 13 and the other end connected to the gate (input terminal of the inverter) of the transistor Qe7.

The capacitor C2 has one end connected to the other end of the capacitor C1 and the other end connected to a connection point between the transistor Qe7 and the transistor Qe8.

The reset switch SWr has one end connected to a connection point between the capacitor C1 and the capacitor C2 and the other end connected to a connection point between the capacitor C2 and the connection point between the transistor Qe7 and the transistor Qe8, and is connected in parallel to the capacitor C2. The reset switch SWr is a switch that is turned on/off in accordance with the reference level reset signal Srst.

The inverter formed by the transistor Qe7 and the transistor Qe8 inverts the light reception signal input via the capacitor C1 and outputs the inverted light reception signal to the quantizer 16.

Here, in the subtractor 15, the potential generated on the side of the buffer 13 of the capacitor C1 at a certain point of time is assumed to be a potential Vinit. Then, it is assumed that the reset switch SWr is turned on at this time. In a case where the reset switch SWr is turned on, the side of the capacitor C1 opposite to the buffer 13 serves as a virtual ground terminal. The potential of the virtual ground terminal is assumed to be zero for convenience. At this time, when the capacitance of the capacitor C1 is denoted by Cp1, a charge CHinit accumulated in the capacitor C1 is represented by the following (Equation 1).

$$CHinit = Cp1 \times Vinit \qquad \text{(Equation 1)}$$

In addition, when the reset switch SWr has been turned on, both ends of the capacitor C2 are short-circuited, and thus the accumulated charge is zero.

Next, it is assumed that the reset switch SWr is turned off. If there is a change in the received light amount, the potential on the side of the buffer 13 of the capacitor C1 is changed from Vinit described above. When the potential after the change is denoted by Vafter, a charge CHafter accumulated in the capacitor C1 is represented by the following (Equation 2).

$$CHafter = Cp1 \times Vafter \qquad \text{(Equation 2)}$$

Meanwhile, when the capacitance of the capacitor C2 is denoted by Cp2 and an output voltage of the subtractor 15 is denoted by Vout, a charge CH2 accumulated in the capacitor C2 is represented by the following (Equation 3).

$$CH2 = -Cp2 \times Vout \qquad \text{(Equation 3)}$$

At this time, since a total charge amount of the capacitors C1 and C2 does not change, the following (Equation 4) is established.

$$CHinit = CHafter + CH2 \qquad \text{(Equation 4)}$$

By substituting (Equation 1) to (Equation 3) into (Equation 4) to be transformed, the following (Equation 5) is obtained.

$$Vout = -(Cp1/Cp2) \times (Vafter - Vinit) \qquad \text{(Equation 5)}$$

(Equation 5) represents a subtraction operation of the voltage signal, and the gain of the subtraction result is Cp1/Cp2.

From (Equation 5), it can be seen that the subtractor 15 outputs a signal representing a difference between the past level (Vinit) of the light reception signal and the current level (Vafter) of the light reception signal.

Here, the potential Vinit corresponds to the reference level Lref described above. From the above description, when the reset switch SWr is turned on, the potential Vinit, that is, the reference level Lref is reset to the current level of the light reception signal, in other words, the level of the light reception signal at the time when the reset switch SWr is turned on.

The quantizer 16 includes a transistor Qe9, a transistor Qe10, a transistor Qe11, and a transistor Qe12, and is configured as a 1.5-bit quantizer.

The transistors Qe9 and Qe11 are P-type transistors, and the transistors Qe10 and Qe12 are N-type transistors.

As illustrated in the drawing, the transistor Qe9 and the transistor Qe10, and the transistor Qe11 and the transistor Qe12 are connected in series between the power supply terminal and the ground terminal, and the output voltage (Vout) of the subtractor 15 is input to each gate of the transistors Qe9 and Qe11. In addition, a voltage Vhigh is applied to the gate of the transistor Qe10, and a voltage Vlow is applied to the gate of the transistor Qe12.

The first polarity event signal Si1 indicating the detection result of the first polarity event is obtained at a connection point between the transistor Qe9 and the transistor Qe10, and the second polarity event signal Si2 indicating the detection result of the second polarity event is obtained at a connection point between the transistor Qe11 and the transistor Qe12.

Specifically, on the side of the transistors Qe9 and Qe10, in a case where the level of the output voltage (Vafter−Vinit) of the subtractor 15 is equal to or larger than a positive threshold value according to the voltage Vhigh, the first polarity event signal Si1 at an H level is obtained at the connection point between the transistor Qe9 and the transistor Qe10. Furthermore, in a case where the level of the output voltage of the subtractor 15 is less than the positive threshold value, the first polarity event signal Si1 at an L level is obtained. That is, at the connection point between the transistor Qe9 and the transistor Qe10, the signal indicating whether or not the received light amount has changed by a predetermined threshold value or more in an increasing direction, that is, the first polarity event signal Si1 indicating the detection result of the first polarity event is obtained.

Furthermore, on the side of the transistors Qe11 and Qe12, in a case where the level of the output voltage of the subtractor 15 is equal to or less than a negative threshold value according to the voltage Vlow, the second polarity event signal Si2 at the H level is obtained at the connection point between the transistor Qe11 and the transistor Qe12, and in a case where the level of the output voltage of the subtractor 15 is larger than the negative threshold value, the second polarity event signal Si2 at the L level is obtained. In this manner, at the connection point between the transistor Qe11 and the transistor Qe12, the signal indicating whether or not the received light amount has changed by a predetermined threshold value or more in a decreasing direction, that is, the second polarity event signal Si2 indicating the detection result of the second polarity event is obtained.

<1-3. Detection of Reflected Light Based on Light Emission Pattern>

First, the relationship between the light emission pattern of the light source 2 and the event occurrence pixel number Neg will be described.

Figure 5:
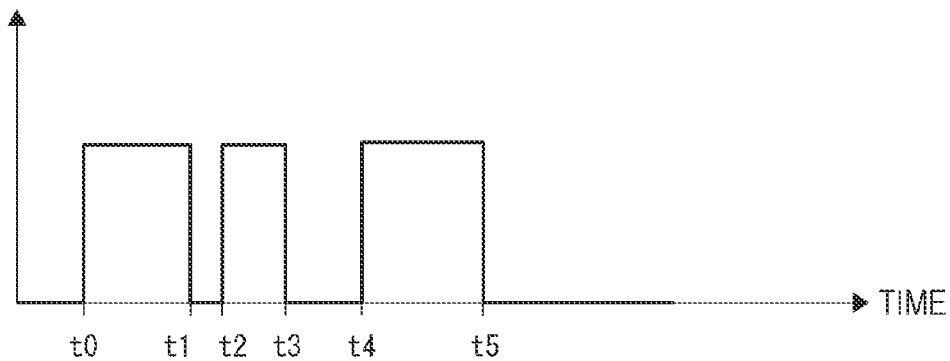
FIG. 5 is a diagram illustrating an example of a light emission pattern.

An example of the light emission pattern Pt output from the light emission control unit 6 to the light source 2 is illustrated in FIG. 5. The vertical axis of the graph illustrated in FIG. 5 represents a control signal (0 or 1), and the horizontal axis represents time. Under the control of light emission on the basis of the illustrated light emission pattern Pt, the light source 2 is controlled to a light emission state from time t0 to time t1, and is controlled to a non-light emission state from time t1 to time t2. In addition, the light source 2 is controlled to the light emission state from time t2 to time t3, and to the non-light emission state from time t3 to time t4. Furthermore, the light source 2 is controlled to the light emission state from time t4 to time t5, and to the non-light emission state after time t5.

Figure 6:
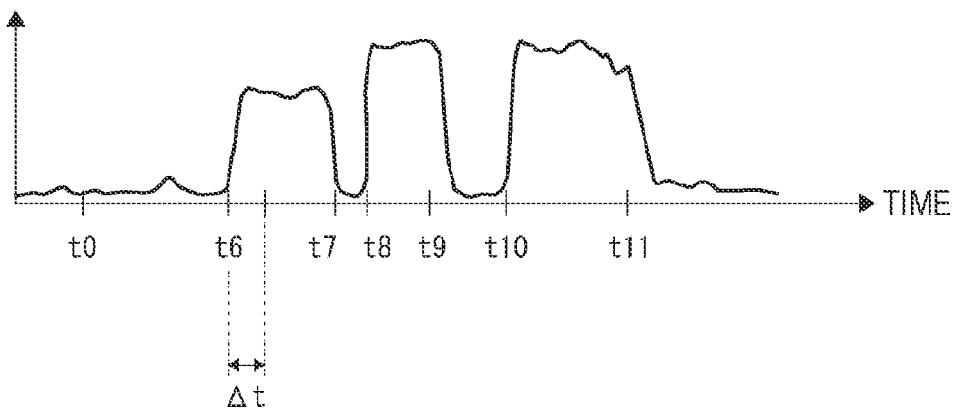
FIG. 6 is a diagram illustrating an example of a change in a received light amount of the first pixel.

The reflected light LR obtained by reflecting the irradiation light LI emitted from the light source 2 by the subject OB in this manner is received by the first pixel G1 in a state where noise or the like is added. FIG. 6 illustrates an example of the received light amount of the first pixel G1.

As illustrated in the drawing, the received light amount is increased from time t6 (>t0) to time t7 (=t6+t1−t0), the received light amount is decreased from time t7 to time t8 (=t6+t2−t0), the received light amount is increased again from time t8 to time t9 (=t6+t3−t0), the received light amount is decreased from time t9 to time t10 (=t6+t4−t0), the received light amount is increased from time t10 to time t11 (=t6+t5−t0), and the received light amount is decreased after time t11.

Note that a difference between time t6 and time t0 according to a distance between the sensing system 1 and the subject OB.

Figure 7:
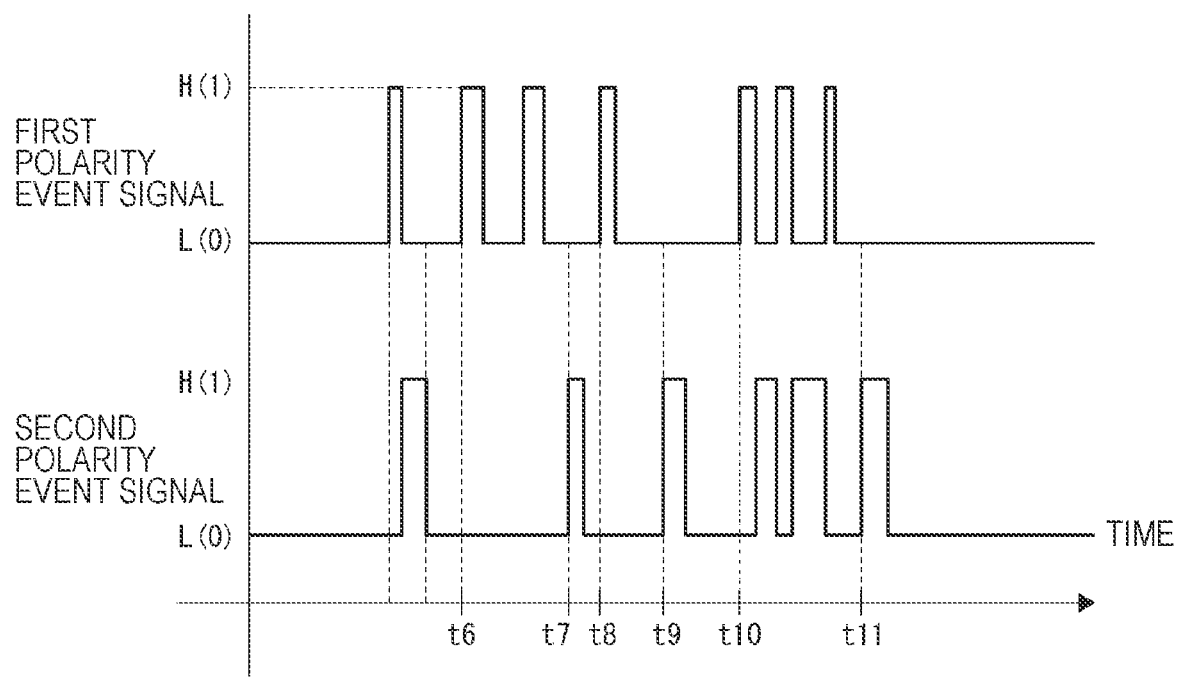
FIG. 7 is a diagram illustrating an example of a first polarity event signal and a second polarity event signal.

The first pixel G1 generates an event signal according to a change in the received light amount illustrated in FIG. 6. For example, the first pixel G1 generates the first polarity event signal Si1 and the second polarity event signal Si2 as illustrated in FIG. 7. Note that the first polarity event signal Si1 at a timing when the first polarity event is detected is H(1), and the first polarity event signal Si1 at a timing when the first polarity event is not detected is L(0). In a similar manner, the second polarity event signal Si2 at a timing when the second polarity event is detected is H(1), and the second polarity event signal Si2 at a timing when the second polarity event is not detected is L(0).

Here, the counter 8 of the signal processor 5 calculates the first event occurrence pixel number Neg1 and the second event occurrence pixel number Neg2. In addition, the counter 8 calculates an event index X from the first event occurrence pixel number Neg1 and the second event occurrence pixel number Neg2.

Here, the first event occurrence pixel number Neg1 is the number of first pixels G1 in which the first polarity event signal Si1 is H (1). In addition, the second event occurrence pixel number Neg2 is the number of the first pixels G1 in which the second polarity event signal Si2 is H (1).

Furthermore, the event index X is a number obtained by subtracting the second event occurrence pixel number Neg2 from the first event occurrence pixel number Neg1. That is, the event index X is calculated by the following Equation (6).

$$X = Neg1 - Neg2 \qquad \text{(Equation 6)}$$

For example, in a case where the number of the first pixels G1 having detected the first polarity event and the number of the first pixels G1 having detected the second polarity event are the same in the entire pixel array unit 4, the event index X=0. On the other hand, in a case where the number of the first pixels G1 having detected the first polarity event is large, the event index X is a positive value, and in a case where the number of the first pixels G1 having detected the second polarity event is large, the event index X is a negative value.

Figure 8:
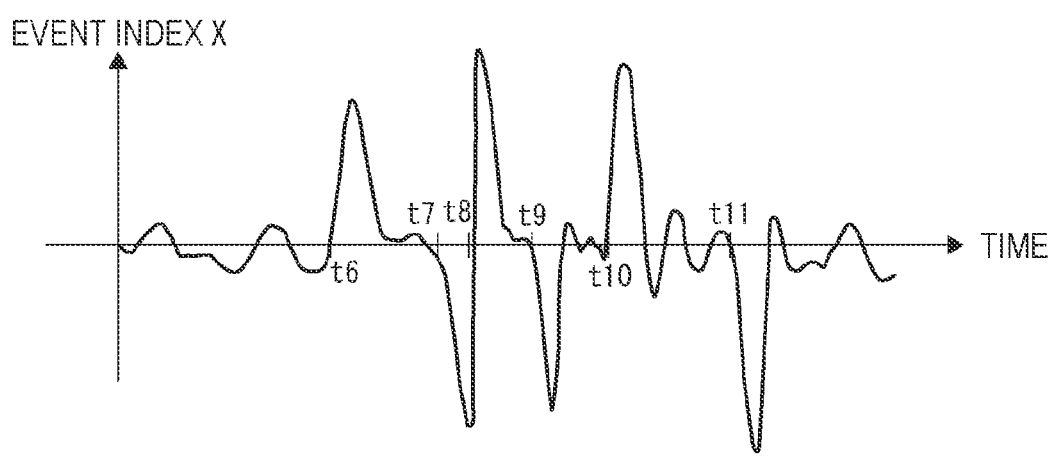
FIG. 8 is a diagram illustrating an example of a change in an event index.

FIG. 8 illustrates an example of a temporal change in the event index X in a case where the light source 2 emits the irradiation light LI on the basis of the light emission pattern Pt illustrated in FIG. 5. A peak of the event index X is observed (see FIG. 8) in accordance with the timings of times t6, t7, t8, t9, t10, and t11 at which the received light amount greatly changes (see FIG. 6).

Next, the correlation estimator 10 of the signal processor 5 estimates the correlation between the light emission pattern Pt and the received light amount of the first pixel G1. Several methods can be considered for processing of estimating the correlation. Specifically, two examples will be described.

(First Correlation Estimation Method)

The first correlation estimation method estimates the received light amount of the reflected light LR received by the entire pixel array unit 4 by integrating the event index X, and estimates the correlation between the received light amount of the reflected light LR and the light emission pattern Pt in the entire pixel array unit 4.

Figure 9:
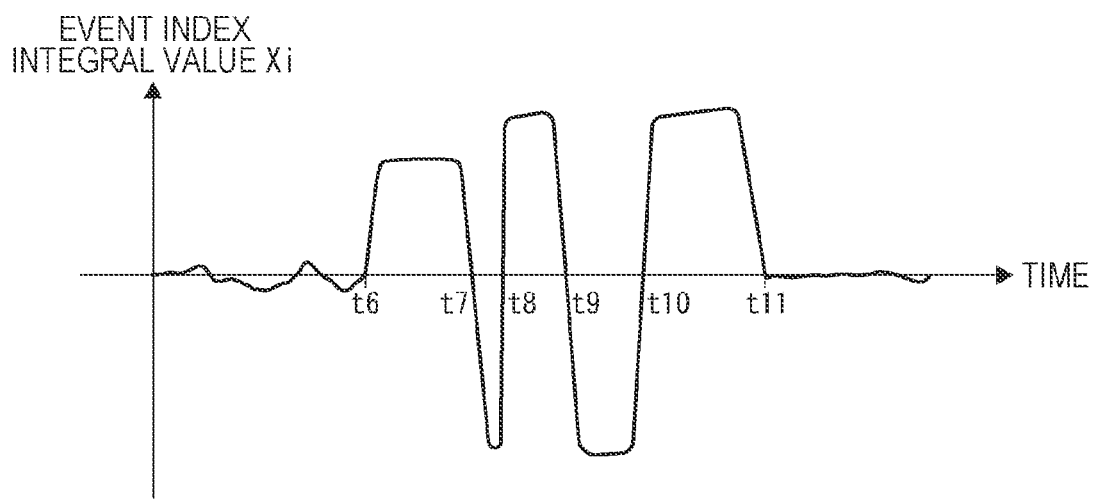
FIG. 9 is a diagram illustrating an example of a change in an event index integral value.

FIG. 9 illustrates an example of an event index integral value Xi obtained by integrating the event index X. An integration section may be a predetermined constant time or may correspond to the light emission pattern Pt. For example, in a case where the integration is performed in accordance with the light emission pattern Pt, the event index integral value Xi as illustrated in FIG. 9 is calculated by performing integration with the integration section from t6 to t7 and then performing integration with the integration section from t7 to t8.

By calculating the correlation between the event index integral value Xi calculated in this manner and the light emission pattern Pt, the correlation between the light emission pattern Pt and the received light amount in the pixel array unit 4 can be estimated. Furthermore, the correlation between the light emission pattern Pt and the received light amount of the reflected light LR received by the first pixel G1 is estimated for every first pixel G1.

In the examples illustrated in FIGS. 5 and 9, there is a high correlation between a waveform of the light emission pattern Pt from time t0 to time t5 and a waveform of the event index integral value Xi from time t6 to time t11.

Therefore, in a change in the received light amount of the reflected light LR received by the entire pixel array unit 4 from time t6 to time t11, a high correlation with the light emission pattern Pt is also estimated. That is, it is found that there is a high possibility that the subject OB is imaged in the first pixel G1 that has output H(1) as the first polarity event signal Si1 near times t6, t8, and t10 and output H(1) as the second polarity event signal Si2 near times t7, t9, and t11.

Note that the correlation estimator 10 may estimate the correlation by calculating an integral value of the event occurrence pixel number Neg instead of calculating an integral value of the event index X.

For example, the event signal Si in which H(1) is output as any event occurs without distinguishing the first polarity event and the second polarity event is considered.

The number of the first pixels G1 that have output H(1) as the event signal Si is counted for every minute time as the event occurrence pixel number Neg, and a value obtained by integrating the event occurrence pixel number Neg is calculated as a pixel number integral value Gi.

Then, upon detection of a time zone in which the correlation between the time interval of the timing when the event occurrence pixel number Neg greatly increases and the time intervals of times t0, t1, t2, t3, and t4 is high, it is possible to estimate a high correlation between the light emission pattern Pt and the received light amount in the first pixel G1 or the pixel array unit 4 in the time zone.

(Second Correlation Estimation Method)

Unlike the first correlation estimation method, the second correlation estimation method estimates the correlation between the received light amount of the reflected light LR and the light emission pattern Pt in the entire pixel array unit 4 without performing integration processing.

Specifically, first, a waveform indicating a temporal change in the event occurrence pixel number Neg is calculated. Note that, here, a first event and a second event are considered separately. That is, a waveform indicating a temporal change in the first event occurrence pixel number Neg1 and a waveform indicating the second event occurrence pixel number Neg2 are calculated.

Figure 10:
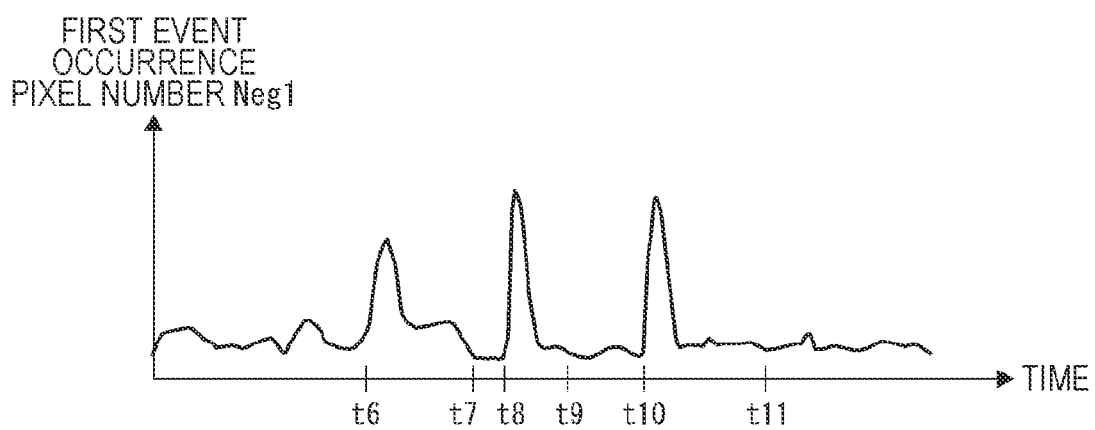
FIG. 10 is a diagram illustrating an example of a change in a first event occurrence pixel number.

FIG. 10 illustrates an example of the waveform indicating the temporal change in the first event occurrence pixel number Neg1. In the first event occurrence pixel number Neg1, peaks appear at timings of times t6, t8, and t10.

Figure 11:
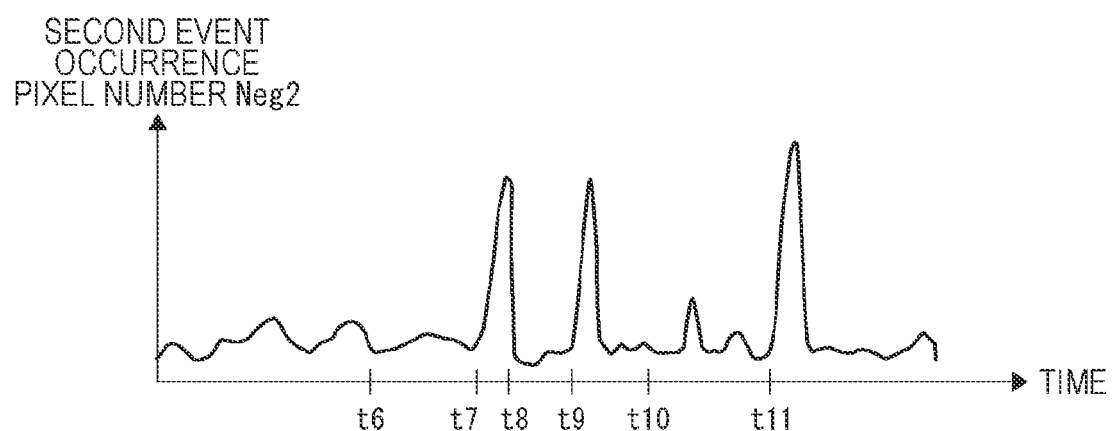
FIG. 11 is a diagram illustrating an example of a change in a second event occurrence pixel number.

In addition, FIG. 11 illustrates an example of the waveform indicating the temporal change in the second event occurrence pixel number Neg2. In the second event occurrence pixel number Neg2, peaks appear at timings of times t7, t9, and t11.

The correlation estimator 10 estimates the correlation between the received light amount of the reflected light LR and the light emission pattern Pt on the basis of the rising edge and the falling edge detected by the edge detector 9. Specifically, the correlation estimator 10 detects an interval between the rising edges of the light emission pattern Pt from the waveform indicating the temporal change in the first event occurrence pixel number Neg1. For example, the presence of rising edges of the light emission pattern Pt are detected at intervals of times t6, t8, and t10. In addition, the correlation estimator 10 detects an interval between the falling edges of the light emission pattern Pt from the waveform indicating the temporal change in the second event occurrence pixel number Neg2. For example, the presence of falling edges of the light emission pattern Pt is detected at intervals of times t7, t9, and t11.

Then, the correlation estimator 10 specifies that there is a high correlation between time intervals of times t6, t7, t8, t9, t10, and t11 and time intervals of the times t0, t1, t2, t3, t4, and t5. Thus, the correlation estimator 10 estimates the correlation between the received light amount of the reflected light LR and the light emission pattern Pt in the entire pixel array unit 4.

The correlation estimator 10 estimates the above correlation by using the first correlation estimation method or the second correlation estimation method, and thus the sensing system 1 can know the timing when the reflected light LR based on the light emission pattern Pt is received by the pixel array unit 4.

Accordingly, the sensing system 1 can function as a proximity sensor.

By executing the processing of estimating the correlation as described above, a pixel region and a light receiving timing of the first pixel G1 that has received the reflected light LR of the irradiation light LI are specified. Therefore, the event signal Si in a time zone other than the time zone in which the reflected light LR is received can be treated as noise. For example, in each of FIGS. 6 to 11, it is specified that the reflected light LR of the irradiation light LI is received in the time zone from time t6 to time t11. Therefore, even when indicated as H(1), the event signal Si generated in a time zone before time t6 and a time zone after time t11 can be removed as noise. The signal corrector 11 corrects the event signal Si by performing such noise removal.

<1-4. Noise Removal in Target Period>

The signal processor 5 performs processing of removing noise in a reception period of the reflected light LR specified by executing the processing of estimating the correlation as described above, specifically, in a period (target period) from time t6 to time t11 in each of FIGS. 6 to 11.

Although several methods are conceivable for noise removal, two methods will be described here. Note that, in each example, a case where the reflected light LR based on the light emission pattern Pt is received in the period from time t6 to time t11 illustrated in FIG. 6 will be described.

(First Noise Removal Method)

A first noise removal method is a method of removing noise from time t6 to time t11 on the basis of the light emission pattern Pt.

Specifically, for example, it is estimated that the reflected light LR according to the rising edge of the irradiation light LI is received until a minute time elapses from time t6. Note that the minute time here is a time shorter than a difference between time t7 and time t6, and is, for example, a minute time Δt illustrated in FIG. 6.

In this minute time Δt, it is possible to estimate that the first pixel G1 in which the first polarity event indicating a change in the received light amount on the increasing side is detected has generated the appropriate first polarity event signal Si1. On the other hand, there is a possibility that the first pixel G1 in which the second polarity event is detected in the minute time Δt has generated the inappropriate second polarity event signal Si2 due to noise. That is, it can be estimated that the second polarity event signal Si2 as H(1) during a period from time t6 until the minute time Δt elapses is due to noise.

In a similar manner, it is estimated that the reflected light LR corresponding to the falling edge of the irradiation light LI is received until a minute time elapses from time t7. Thus, there is a possibility that the first polarity event signal Si1 generated from time t7 until the minute time elapses is not be appropriate. Therefore, it can be estimated that the first polarity event signal Si1 as H(1) during a period from time t7 until the minute time elapses is due to noise.

In this way, the signal corrector 11 corrects the first polarity event signal Si1 and the second polarity event signal Si2 between time t6 and time t11, and outputs the corrected event signal Sic.

In the corrected event signal Sic corrected by the first noise removal method, the influence of noise is removed not only in the time zone before time t6 and the time zone after time t11 but also in the period from time t6 to time t11.

(Second Noise Removal Method)

A second noise removal method is a method of removing noise from time t6 to time t11 in accordance with a change in the received light amount before time t6 and a change in the received light amount after time t11.

Figure 12:
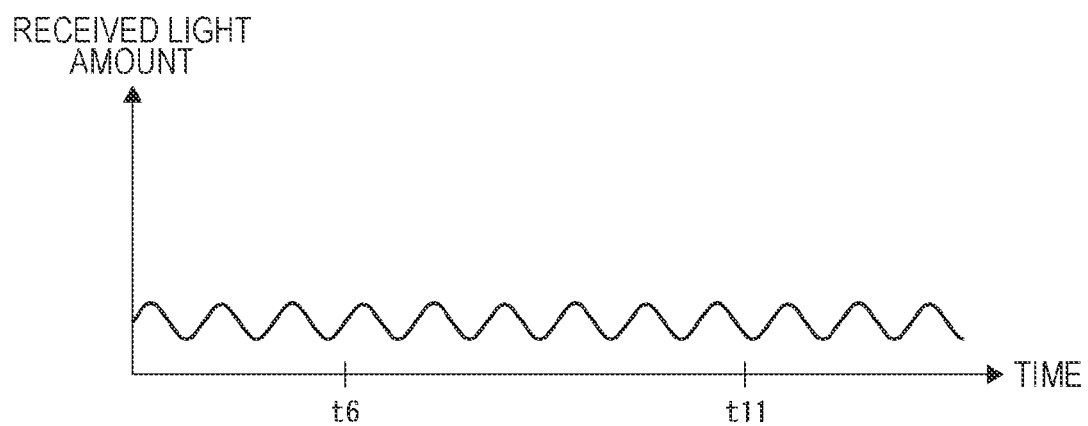
FIG. 12 is a diagram illustrating an example of stationary noise.

This method is effective in a case where steady noise as illustrated in FIG. 12 is included in the light received by the pixel array unit 4.

Specifically, the signal corrector 11 performs stationary noise analysis on the basis of a change in the received light amount in the pixel array unit 4 before time t6 and a change in the received light amount in the pixel array unit 4 after time t11.

Then, the signal corrector 11 performs noise removal by estimating a change in the received light amount due to a noise component between time t6 and time t11 on the basis of the analysis result.

Alternatively, the signal corrector 11 analyzes a change mode of the first event occurrence pixel number Neg1 and the second event occurrence pixel number Neg2 in the time zone before time t6 and the time zone after time t11. Then, the signal corrector 11 estimates the first event occurrence pixel number Neg1 and the second event occurrence pixel number Neg2 caused by noise in the time zone from time t6 to time t11, excludes each of the estimated pixel numbers, and estimates the numbers of pixels in which an event is actually detected in the time zone from time t6 to time t11 (the first event occurrence pixel number Neg1 and the second event occurrence pixel number Neg2).

The signal corrector 11 may calculate the event index X estimated as a true value on the basis of the estimated first event occurrence pixel number Neg1 and the estimated second event occurrence pixel number Neg2, and output the event index X as the corrected event signal Sic to the subsequent stage.

2. Second Embodiment

Figure 13:
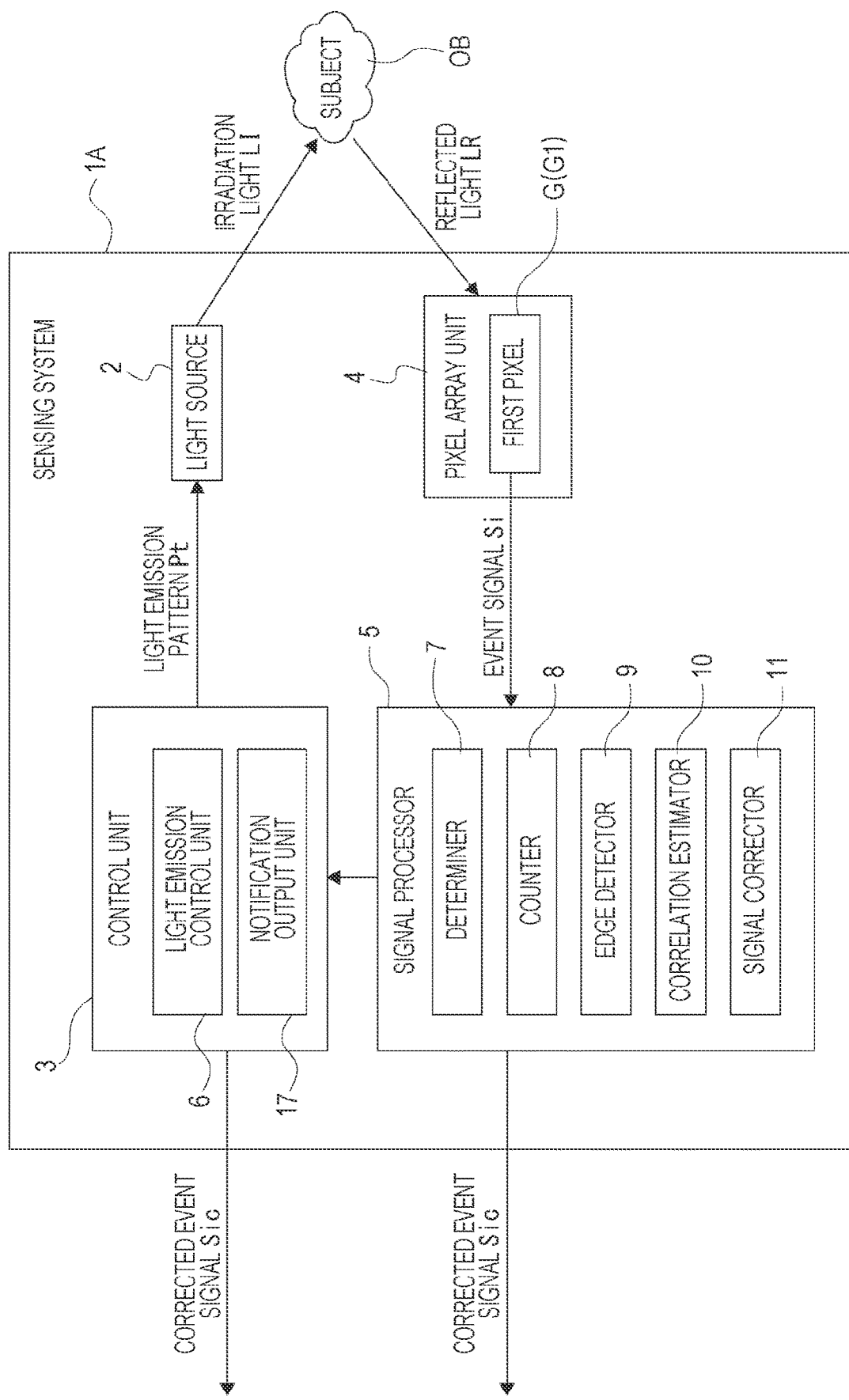
FIG. 13 is a block diagram illustrating a configuration example of a sensing system according to a second embodiment.

FIG. 13 illustrates a configuration example of a sensing system 1A according to a second embodiment. Note that components similar to those of the sensing system 1 according to the first embodiment are denoted by the same reference signs, and description thereof will be omitted as appropriate.

The control unit 3 of the sensing system 1A includes a notification output unit 17 in addition to the configuration included in the control unit 3 of the sensing system 1 illustrated in FIG. 1.

The notification output unit 17 receives an estimation result of correlation from the signal processor 5 and outputs a notification according to the estimation result to the outside of the sensing system 1A.

The notification output unit 17 provides notification that the reception of the reflected light LR having a high correlation with the light emission pattern Pt has been confirmed. As a result, the sensing system 1 can provide notification that the subject OB is located within a predetermined distance in which the reflected light LR based on at least the light emission pattern Pt reaches the pixel array unit 4.

In a case where the sensing system 1 is used as, for example, a proximity sensor, it is possible to perform processing or the like of further analyzing the subject OB in proximity in a device or a processor in the subsequent stage.

In addition, the notification output unit 17 may provide notification that reception of the reflected light LR having a high correlation with the light emission pattern Pt has not been confirmed.

The device or the processor in the subsequent stage, which receives such a notification, can stand by without executing various processing to be executed when the proximity of the subject is detected. It is therefore possible to reduce a processing load in the device and the processor in the subsequent stage.

3. Third Embodiment

Figure 14:
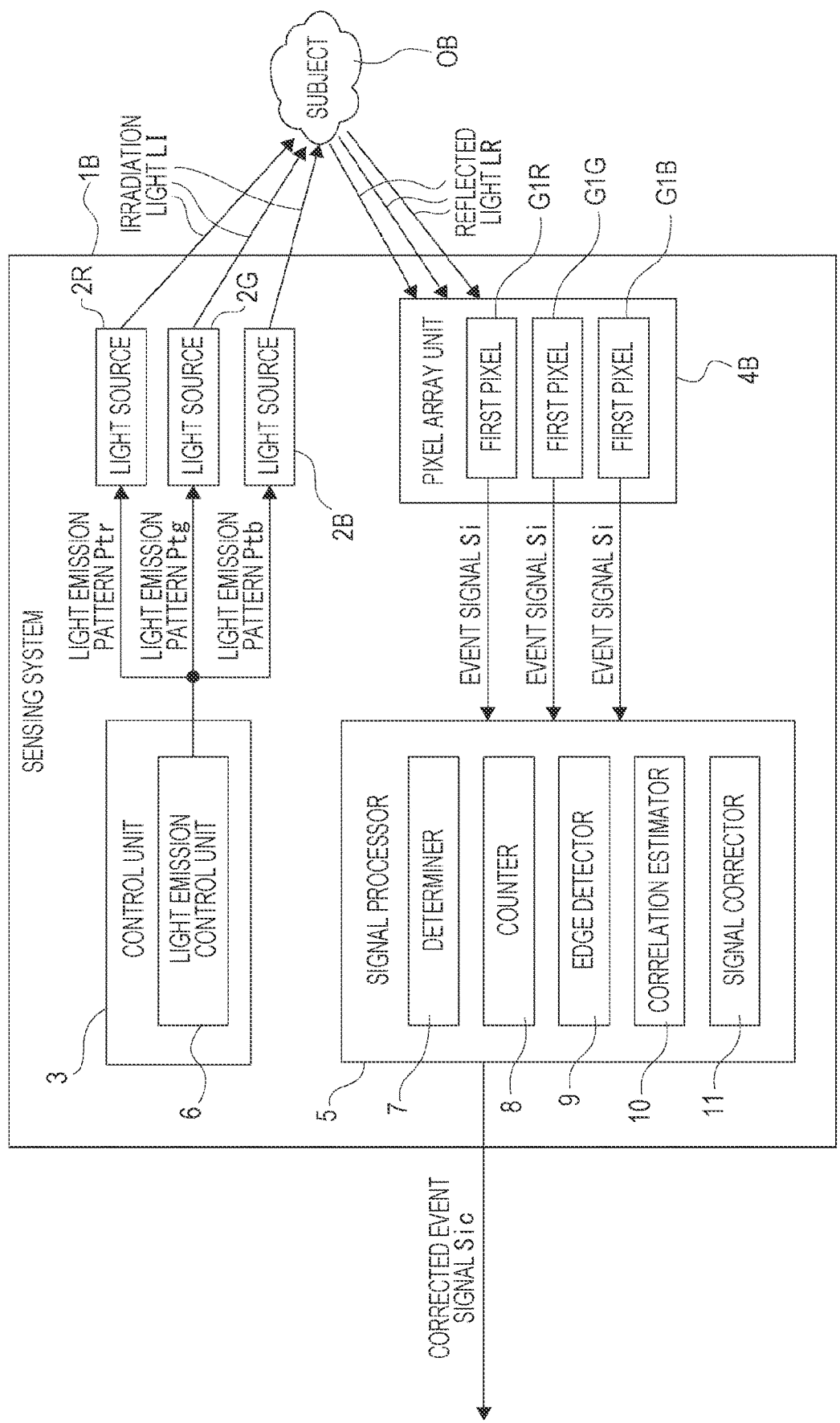
FIG. 14 is a block diagram illustrating a configuration example of a sensing system according to a third embodiment.

FIG. 14 illustrates a configuration example of a sensing system 1B according to a third embodiment.

Note that components similar to those of the sensing system 1 according to the first embodiment and the sensing system 1A according to the second embodiment are denoted by the same reference signs, and description thereof will be omitted as appropriate.

The sensing system 1B is different from each of the above examples in the configuration of the light source 2, the light emission control unit 6 of the control unit 3, and the first pixel G1 included in the pixel array unit 4.

First, the light source 2 is configured to be capable of emitting light of a plurality of wavelengths. For example, the sensing system 1B may include a plurality of types of light sources 2. A sensing system 1B illustrated in FIG. 14 includes a light source 2R capable of emitting red light, a light source 2G capable of emitting green light, and a light source 2B capable of emitting blue light.

The light emission control unit 6 controls light emission of the light source 2R on the basis of a light emission pattern Ptr for the light source 2R. In addition, the light emission control unit 6 controls light emission of the light source 2G on the basis of a light emission pattern Ptg for the light source 2G, and controls light emission of the light source 2B on the basis of a light emission pattern Ptb for the light source 2B.

Figure 15:
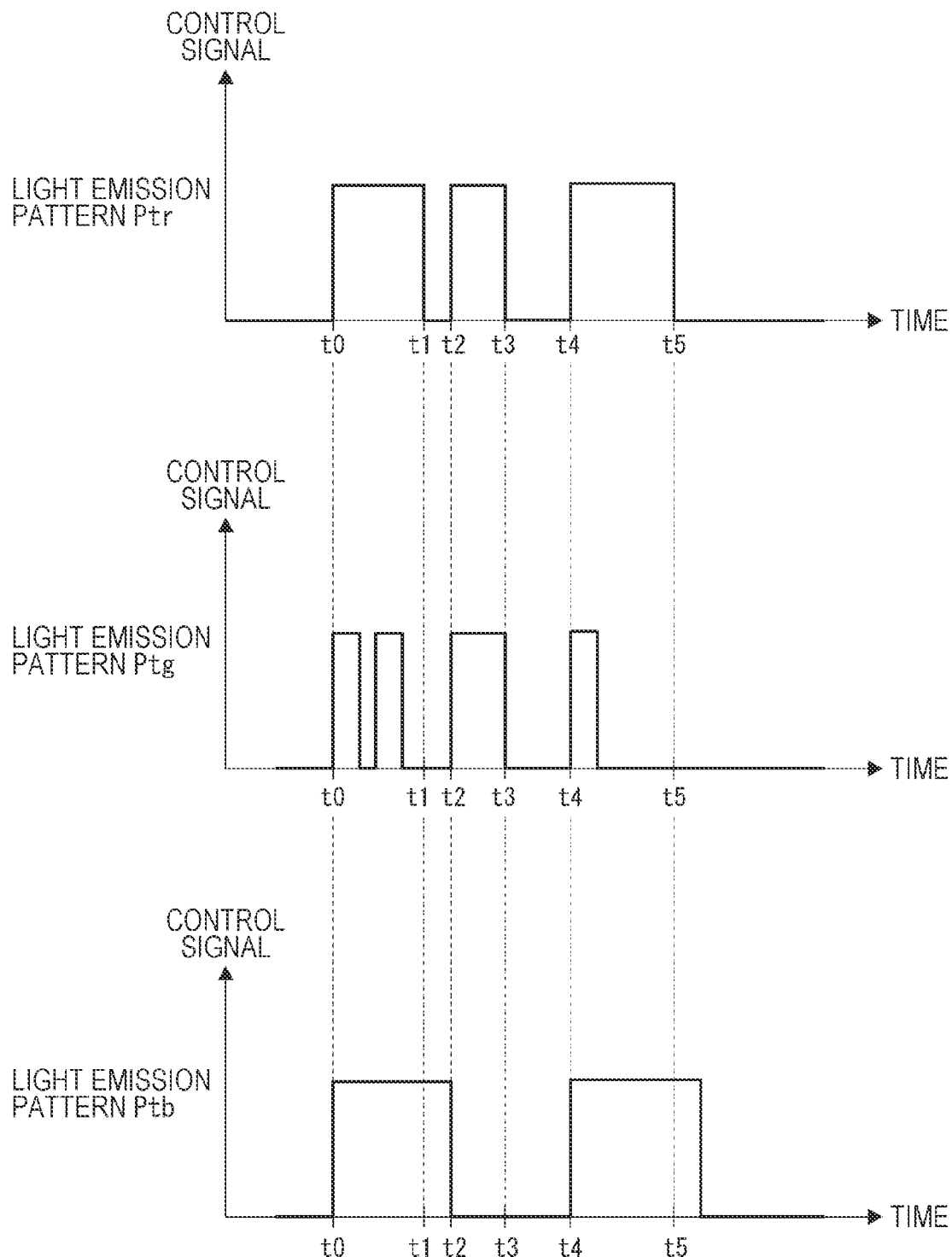
FIG. 15 is a diagram illustrating an example of light emission patterns applied to three types of light sources having different wavelengths.

The light emission pattern Ptr, the light emission pattern Ptg, and the light emission pattern Ptb are different patterns as in an example illustrated in FIG. 15.

The light emission pattern Ptr is the same pattern as the light emission pattern Pt illustrated in FIG. 5. In addition, by controlling the light source 2G on the basis of the light emission pattern Ptg, the light source 2G is controlled to repeat the light emission state and the non-light emission state twice each between time t0 and time t2, is controlled to the light emission state from time t2 to time t3, is controlled to the non-light emission state from time t3 to time t4, and is controlled to repeat the light emission state and the non-light emission state once each between time t4 and time t5.

Furthermore, by controlling the light source 2B on the basis of the light emission pattern Ptb, the light source 2B is controlled to the light emission state from time t0 to time t2, is controlled to the non-light emission state from time t2 to time t4, and is controlled to the light emission state from time t4 to a time slightly exceeding time t5.

The irradiation light LI having a predetermined wavelength is emitted from each of the light sources 2R, 2G, and 2B. Each of the three types of irradiation light LI is received by a pixel array unit 4B as the reflected light LR reflected by the subject OB.

The pixel array unit 4B includes a first pixel G1R having sensitivity to red light, a first pixel G1G having sensitivity to green light, and a first pixel G1B having sensitivity to blue light. For example, the first pixel G1R has a red color filter, the first pixel G1G has a green color filter, and the first pixel G1B has a blue color filter.

The first pixel G1R receives the reflected light LR of the irradiation light LI emitted from the light source 2R. That is, the first polarity event and the second polarity event according to the change in a light amount of the irradiation light LI emitted from the light source 2R are detected in the first pixel G1R.

In a similar manner, in the first pixel G1G, the first polarity event and the second polarity event according to the irradiation light LI emitted from the light source 2G are detected. In the first pixel G1B, the first polarity event and the second polarity event according to the irradiation light LI emitted from the light source 2B are detected.

In the first pixel G1R, a first polarity event signal Si1r and a second polarity event signal Si2r are generated. Similarly, a first polarity event signal Si1g and a second polarity event signal Si2g are generated in the first pixel G1G, and a first polarity event signal Si1b and a second polarity event signal Si2b are generated in the first pixel G1B.

Each processing executed by each component of the signal processor 5 is similar to the processing according to the first embodiment. However, each processing is executed for every wavelength. For example, in a case where various processing is performed on red light, the first polarity event signal Si1r and the second polarity event signal Si2r are treated instead of the first polarity event signal Si1 and the second polarity event signal Si2 in the first embodiment. In addition, the light emission pattern Ptr is treated instead of the light emission pattern Pt. As a result, a correlation between the light emission pattern Ptr and the received light amount of red light is estimated.

In a similar manner, in a case where various processing is performed on green light, the first polarity event signal Si1g and the second polarity event signal Si2g are treated instead of the first polarity event signal Si1 and the second polarity event signal Si2 in the first embodiment, and the light emission pattern Ptg is treated instead of the light emission pattern Pt. As a result, a correlation between the light emission pattern Ptg and the received light amount of green light is estimated.

Furthermore, in a case where various processing is performed on blue light, the first polarity event signal Si1b and the second polarity event signal Si2b are treated instead of the first polarity event signal Si1 and the second polarity event signal Si2 in the first embodiment, and the light emission pattern Ptb is treated instead of the light emission pattern Pt. As a result, a correlation between the light emission pattern Ptb and the received light amount of blue light is estimated.

Then, upon detection of a time zone in which the above correlation for red light, the above correlation for green light, and the above correlation for blue light are all high, the correlation estimator 10 can estimate that the subject OB is located within a predetermined distance in which the reflected light LR of the irradiation light LI emitted from the light source 2 in the time zone reaches the pixel array unit 4.

Note that, instead of including the plurality of light sources 2, the sensing system 1B may include one light source 2 and a plurality of color filters to be capable of emitting light of a plurality of wavelengths.

In addition, the sensing system 1B may include only one light source 2 that can change the wavelength of the irradiation light. Specifically, the color of the irradiation light LI may be changed instead of controlling the three light sources 2R, 2G, and 2B respectively by using the light emission patterns Ptr, Ptg, and Ptb illustrated in FIG. 15. For example, with reference to the example illustrated in FIG. 15, the wavelength may be controlled so that blue light is emitted between time t1 and time t2, and the wavelength may be controlled so that yellow light in which red light and green light are mixed are emitted between time t2 and time t3.

4. Fourth Embodiment

Figure 16:
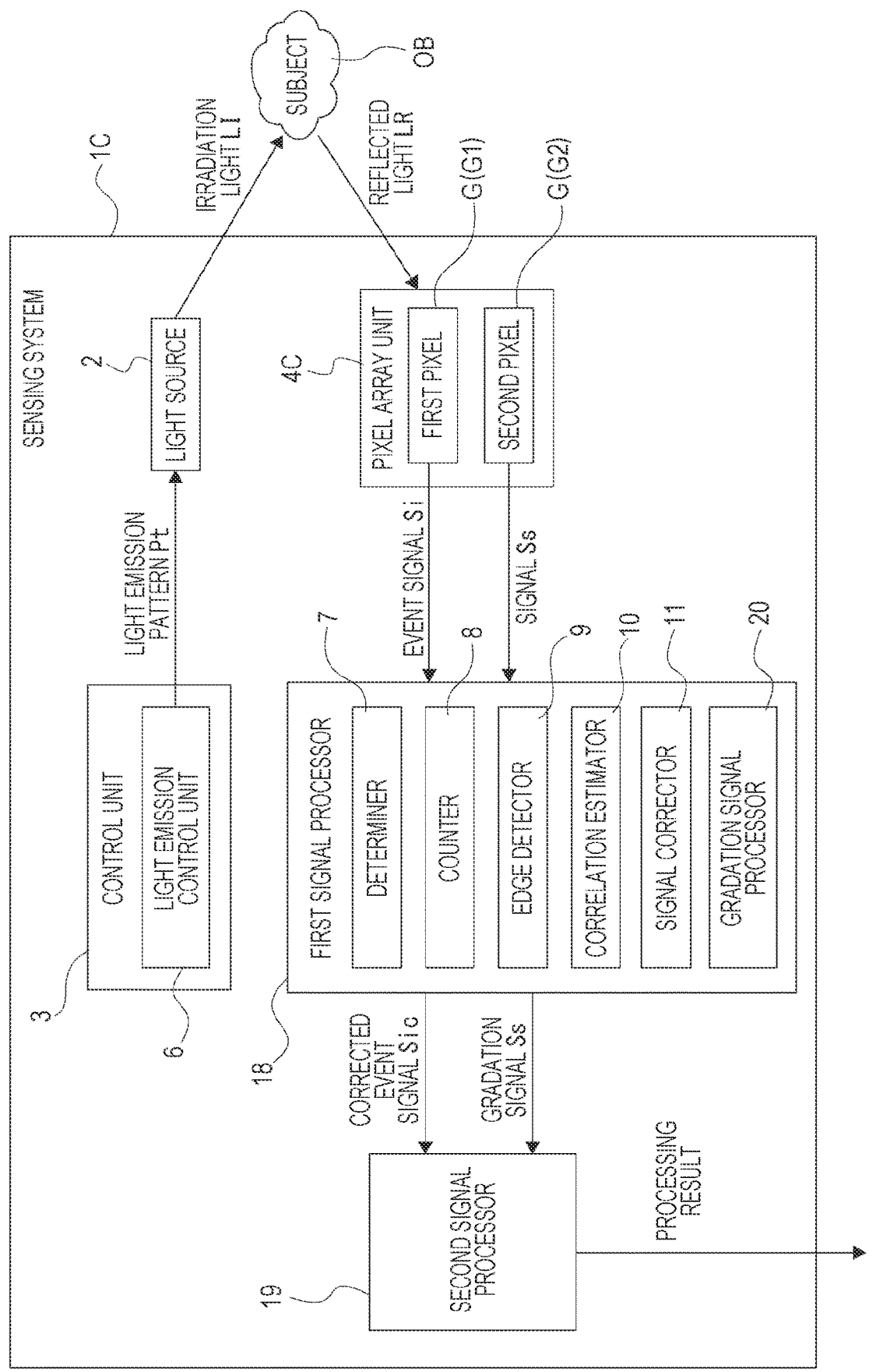
FIG. 16 is a block diagram illustrating a configuration example of a sensing system according to a fourth embodiment.

A sensing system 1C according to a fourth embodiment includes the pixel G that outputs a gradation signal Ss. FIG. 16 illustrates a configuration example of the sensing system 1C. Note that the configurations described above are denoted by the same reference signs as those illustrated in each of the above drawings, and description thereof will be omitted as appropriate.

The sensing system 1C includes the light source 2, the control unit 3, a pixel array unit 4C, a first signal processor 18, and a second signal processor 19. The configurations of the light source 2 and the control unit 3 will not be described.

The pixel array unit 4C includes a second pixel G2 in addition to the first pixel G1. The first pixel G1 detects a change in the received light amount and outputs the event signal Si, whereas the second pixel G2 outputs the gradation signal Ss according to the received light amount. The second pixel G2 includes an on-chip lens, a color filter, a read circuit, a reset circuit, and the like. Note that the gradation signal Ss output from the second pixel G2 is a digital signal.

Several configurations of the pixel array unit 4C are conceivable. For example, a first pixel array including the first pixel G1 and a second pixel array including the second pixel G2 may be provided. That is, there may be provided two pixel arrays including a rectangular pixel array in which the first pixels G1 are arranged in a matrix and a rectangular pixel array in which the second pixels G2 are arranged in a matrix.

Figure 17:
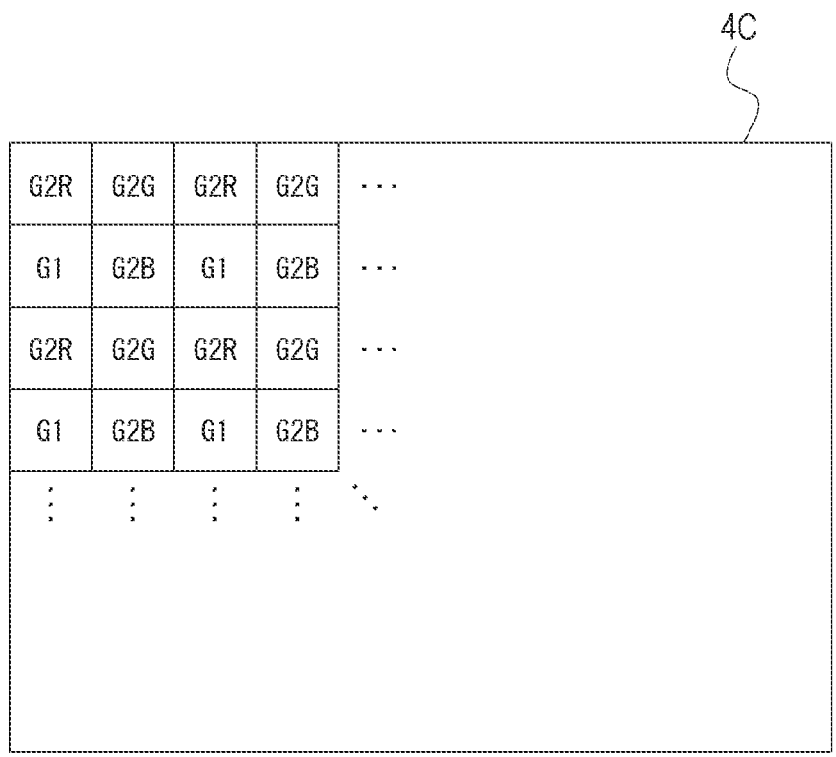
FIG. 17 is a schematic diagram illustrating a configuration example of a pixel array unit according to the fourth embodiment.

Alternatively, the first pixel G1 and the second pixel G2 may be disposed in one pixel array. That is, the first pixel G1 and the second pixel G2 may be formed on the same sensor chip. An example is illustrated in FIG. 17.

In a pixel array including a color filter having a general Bayer array, one second pixel G2R having sensitivity to red light, one second pixel G2B having sensitivity to blue light, and two second pixels G2G having sensitivity to green light are disposed in a region of a total of four pixels including two pixels in each of vertical and horizontal directions.

In the pixel array unit 4C according to the present embodiment, one of the two second pixels G2G disposed in the region of a total of four pixels is replaced with the first pixel G1. That is, one first pixel G1, one second pixel G2R, one second pixel G2G, and one second pixel G2B are disposed in a region of a total of four pixels including two pixels in each of the vertical and horizontal directions.

In a similar manner to the signal processor 5 described above, the first signal processor 18 includes the determiner 7, the counter 8, the edge detector 9, the correlation estimator 10, and the signal corrector 11. The determiner 7, the counter 8, the correlation estimator 10, and the signal corrector 11 output the corrected event signal Sic by performing the above various processing on the event signal Si output from the first pixel G1 included in the pixel array unit 4C.

In addition to each of these components, the first signal processor 18 includes a gradation signal processor 20 that performs signal processing on the gradation signal Ss. The gradation signal processor 20 performs various signal processing on the gradation signal as the digital signal output from the second pixel G2. For example, the gradation signal processor 20 performs preprocessing and the like.

For example, in the preprocessing, clamp processing of clamping black levels of R, G, and B to a predetermined level, correction processing between color channels of R, G, and B, and the like are performed on the gradation signal.

The gradation signal Ss to which the signal processing in the gradation signal processor 20 is applied is output to the second signal processor 19 together with the corrected event signal Sic.

The second signal processor 19 performs signal processing using the corrected event signal Sic and the gradation signal Ss. Some examples will be described.

(First Example of Signal Processing)

A first example of the signal processing executed by the second signal processor 19 relates to processing for enhancing accuracy of an edge image. For example, the corrected event signal Sic is obtained by correcting the event signal Si erroneously detected due to noise or the like. It is therefore possible to generate an edge image with a certain degree of high accuracy.

Here, in order to further increase the accuracy, signal processing for generating contrast information by using the gradation signal Ss is performed for each pixel that is an edge portion in the edge image generated on the basis of the corrected event signal Sic.

Then, signal processing such as invalidating the corrected event signal Sic is performed on the pixel in which only a low contrast is detected in the adjacent pixel. Consequently, the accuracy of the edge image can be improved on the basis of the gradation signal Ss.

In addition, as for the gradation signal Ss, only information corresponding to a pixel that is an edge portion in the edge image generated on the basis of the corrected event signal Sic is only required to be stored. As a result, storage capacity of a storage that stores the gradation signal Ss can be reduced.

(Second example of signal processing)

A second example of the signal processing executed by the second signal processor 19 relates to processing for tracking the subject OB. For example, the second signal processor 19 performs signal processing for recognizing the subject OB by using the gradation signal Ss. Thus, the subject OB is specified. Then, the second signal processor 19 performs tracking processing by using the corrected event signal Sic on the recognized subject OB.

Since the corrected event signal Sic is a highly accurate signal from which noise and the like are removed as described above, the subject OB is tracked by using the corrected event signal Sic to prevent the subject OB from being lost.

In addition, in general, the first pixel G1 that generates the event signal Si can operate at a higher frequency than the second pixel G2 that generates the gradation signal Ss. Furthermore, the signal processing for detecting the subject OB on the basis of the gradation signal Ss is heavy processing with a large amount of calculation.

Therefore, instead of reducing an execution frequency of detection processing of the subject OB based on the gradation signal Ss, the tracking during that time is performed on the basis of the event signal Si generated at a high frequency. As a result, it is possible to perform highly accurate tracking of the subject OB while reducing the processing load of the sensing system 1C.

Note that tracking can be performed at a similar frequency by increasing a frame rate of the gradation signal Ss. However, since the information amount of the gradation signal Ss is generally large, it is possible to reduce the information amount used for processing by tracking the subject OB by using the corrected event signal Sic having a small information amount as in the present example.

In addition, a generation frame rate of the corrected event signal Sic is higher than a frame rate of the image frame generated on the basis of the gradation signal Ss. It is therefore conceivable that the second signal processor 19 executes blur removal processing (deblurring processing) using the corrected event signal Sic on the image data generated on the basis of the gradation signal Ss. Accordingly, it is possible to generate image data from which blur of a moving subject has been removed.

In addition to the two examples described here, it is conceivable that the second signal processor 19 executes processing for a simultaneous localization and mapping (SLAM) technology used in an automated driving technology, an automatic guided vehicle (AGV), and the like. That is, by using the corrected event signal Sic with high accuracy, the position and movement of an obstacle or the like can be accurately recognized. As a result, self-position specifying processing, mapping processing, the route generation processing can be accurately performed.

5. Fifth Embodiment

A sensing system 1D according to a fifth embodiment performs light reception control of the pixel array unit 4 by using the light emission pattern Pt. Note that the configurations described above are denoted by the same reference signs as those illustrated in each of the above drawings, and description thereof will be omitted as appropriate.

Figure 18:
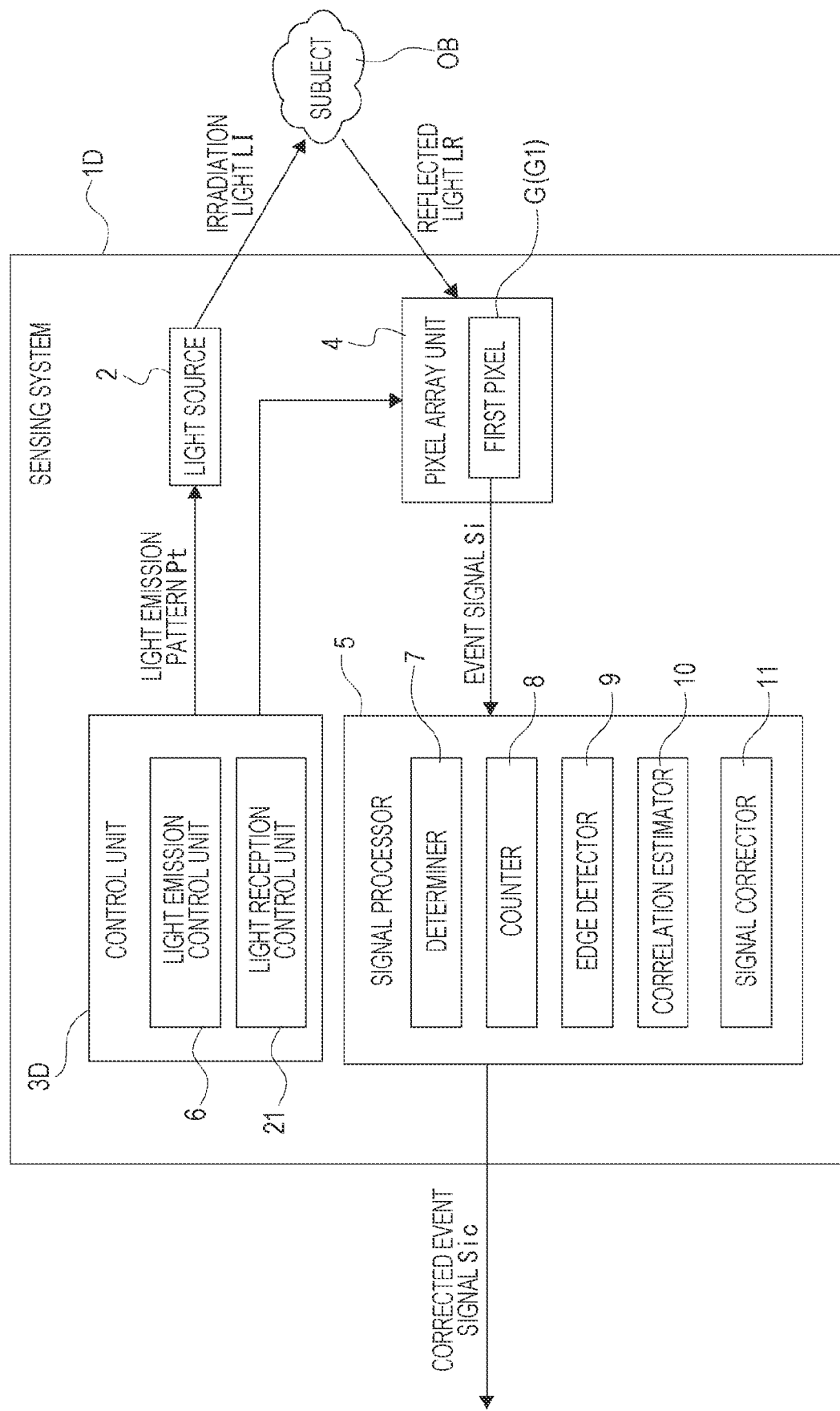
FIG. 18 is a block diagram illustrating a configuration example of a sensing system according to a fifth embodiment.

The sensing system 1D includes the light source 2, a control unit 3D, the pixel array unit 4, and the signal processor 5 as illustrated in FIG. 18. The configurations of the light source 2 and the signal processor 5 will not be described.

The control unit 3D includes a light reception control unit 21 in addition to the light emission control unit 6 The light reception control unit 21 performs light reception control of the pixel array unit 4 on the basis of the light emission pattern Pt provided from the light emission control unit 6 to the light source 2.

Specifically, in the light reception control unit 21, the timing at which the light source 2 is set to the light emission state on the basis of the light emission pattern Pt that causes the light source 2 to emit light is known. Therefore, in a case where the sensing system 1D functions as a proximity sensor, or the like, the reflected light LR based on the light emission pattern Pt cannot be generated in a time zone when the light source 2 does not reliably emit light. Therefore, it is possible to stop the function as a proximity sensor by stopping driving of the pixel array unit 4.

Figure 19:
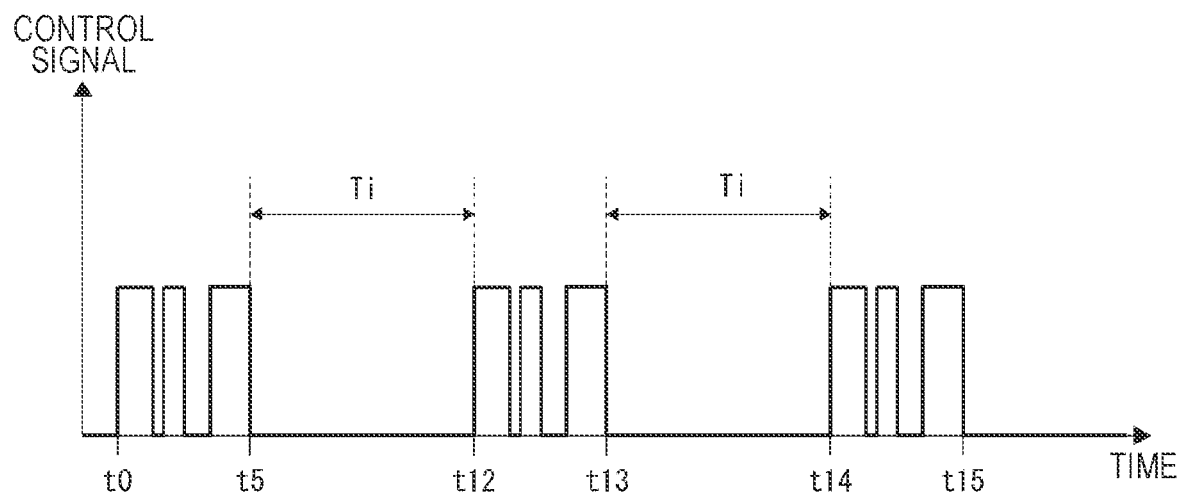
FIG. 19 is a diagram illustrating an example of a light emission pattern according to the fifth embodiment.

For example, the light emission pattern Pt that outputs the pattern illustrated in FIG. 6 at regular time intervals will be considered. FIG. 19 illustrates an example of the light emission pattern Pt. The light emission control unit 6 outputs a control signal of a predetermined pattern to the light source 2 from time t0 to time t5, outputs an L(0) signal for setting the light source 2 to the non-light emission state from time t5 to time t12, outputs a control signal of a predetermined pattern from time t12 to time t13, outputs the L signal from time t13 to time t14, and outputs a control signal of a predetermined pattern from time t14 to time t15. Note that a time width from time t5 to time t12 and a time width from time t13 to time t14 are defined as time Ti.

Figure 20:
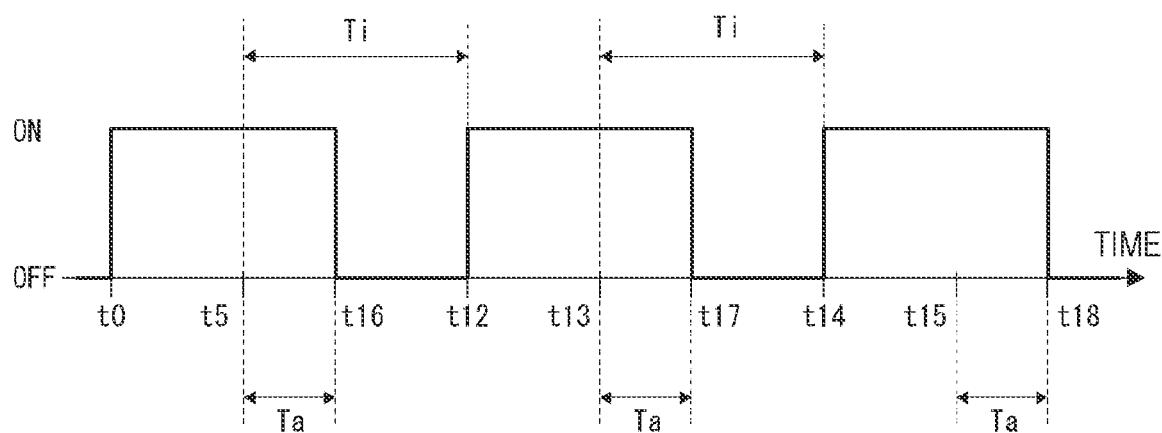
FIG. 20 is a diagram illustrating an example of a control signal applied to a pixel array unit.

In accordance with such a light emission pattern Pt, the light reception control unit 21 outputs an H(1) signal for controlling the pixel array unit 4 to the driving state and L(0) for controlling the pixel array unit 4 to the non-driving state. An example is illustrated in FIG. 20. As illustrated in the drawing, the reflected light LR based on the irradiation light LI of the light source 2 is not received in a time zone before time t0, and thus the light reception control unit 21 outputs the L signal to the pixel array unit 4.

Furthermore, there is a possibility that the pixel array unit 4 receives the reflected light LR based on the irradiation light LI of the light source 2 in a time zone from time t0 to time t5 and from time t5 to time t16 at which a predetermined time Ta has elapsed, and thus the light reception control unit 21 outputs the H signal to the pixel array unit 4.

Time Ta is determined by a detection distance of the subject OB. That is, in a case where it is not desired to detect the subject OB until the subject OB moves to a closer position, time Ta is only required to be shortened. Furthermore, in a case where it is desired to detect the subject OB at a farther position, time Ta is only required to be lengthened.

Since a time zone from time t16 to time t12 is a time zone in which the reflected light LR based on the irradiation light LI of the light source 2 is not received by the pixel array unit 4 or a time zone in which the reflected light LR reflected by the subject OB farther than the detection distance is received, the light reception control unit 21 outputs the L signal to the pixel array unit 4 to stop light reception processing in the pixel array unit 4.

In a similar manner, the light reception control unit 21 outputs the L signal to the pixel array unit 4 in a time zone from time t17 to time t14, outputs the H signal in a time zone from time t14 to time t18, and outputs the L signal in a time zone after time t18.

In this way, by providing a time zone in which the pixel array unit 4 is in a stop state, it is possible to achieve a long life and low power consumption of the pixel array unit 4. In a case of a portable device in particular, the sensing system 1D can be continuously used for a long time by reducing power consumption and can be more convenient.

Note that, not limited to the fifth embodiment, by repeating a predetermined pattern at regular time intervals as illustrated in FIG. 19, erroneous detection of a subject is suppressed, for example, and reliability of the corrected event signal Sic can be improved.

6. FLOWCHART

Figure 21:
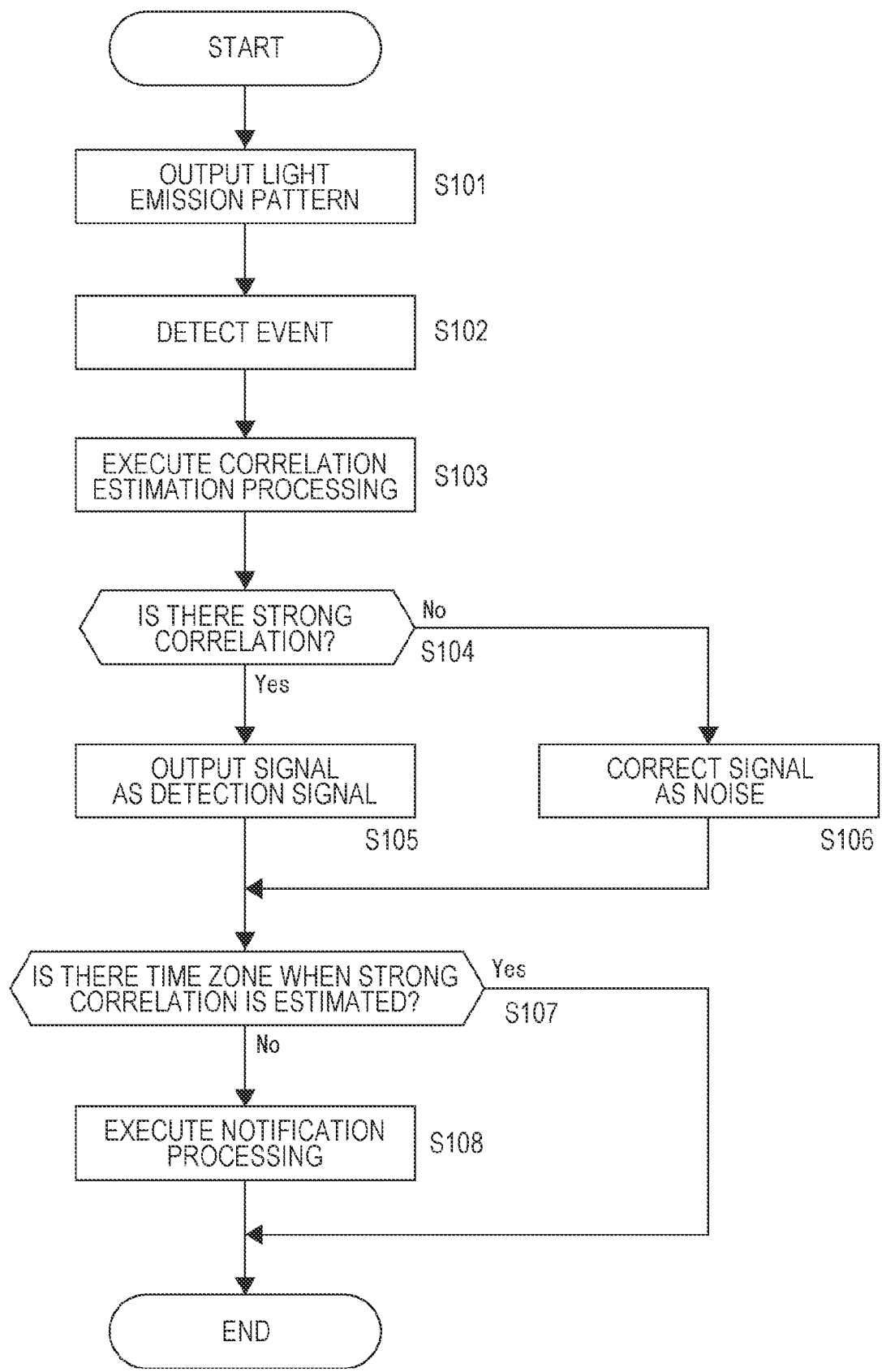
FIG. 21 is an example of a flowchart executed by a processor.

FIG. 21 illustrates a flowchart of processing executed by the control units 3 and 3D and the signal processor 5 to implement each of the sensing systems 1 (1A, 1B, 1C, 1D) described above.

Note that, in the following description, the control units 3 and 3D and the signal processor 5 will be simply referred to as "processor" without distinction.

In step S101, the processor performs processing of outputting the light emission pattern Pt to the light source 2. Accordingly, the light source 2 irradiates light on the basis of the light emission pattern Pt.

In step S102, the processor detects an event. The event detection is performed by detecting a change event of the received light amount in the first pixel G1 included in the pixel array unit 4.

In step S103, the processor performs correlation estimation processing. The correlation estimation processing is processing of estimating the correlation between the light emission pattern Pt and the change in the received light amount in the first pixel G1 (or the pixel array unit 4) by detecting the event occurrence pixel number Neg (or the first event occurrence pixel number Neg1 or the second event occurrence pixel number Neg2) or an edge of the light emission pattern Pt.

In step S104, the processor determines whether or not a high correlation is estimated between the light emission pattern Pt and the change in the received light amount in the first pixel G1 (or the pixel array unit 4).

The time zone in which the high correlation is estimated can be estimated as a period in which the reflected light LR of the irradiation light LI based on the light emission pattern Pt is received. Therefore, in step S105, the processor outputs such an event signal Si as a detection signal.

On the other hand, the time zone in which the high correlation is not estimated can be estimated as the event signal Si detected due to noise or the like irrelevant to the light emission pattern Pt. In such a case, the processor corrects the event signal Si as noise in step S106. As a result, the corrected event signal Sic is output from the signal processor 5.

Note that various methods are conceivable for the correction of the event signal Si as described in the item of noise removal in the target period.

In step S107, the processor determines whether or not there is a time zone in which a strong correlation can be estimated in the entire period in which the event is detected.

In a case where there is no time zone in which a strong correlation can be estimated, the processor performs notification processing in step S108. Accordingly, for example, in the sensing system 1 functioning as a proximity sensor, it is possible to provide notification that a proximity object has not been detected.

Note that, in a case where the light emission patterns Ptr, Ptg, and Ptb are set for every one of a plurality of different wavelengths, detection of an event is also performed for every one of the wavelengths. In this case, it is desirable to perform each processing from step S101 to step S106 for every one of the wavelengths.

In addition, the corrected event signal Sic output by executing the processing illustrated in FIG. 21 is used alone in the signal processor in the subsequent stage, and thus the sensing system 1 can perform a function as a proximity sensor and a function as a distance sensor. Moreover, by using both the corrected event signal Sic and the gradation signal Ss output from the second pixel G2, as described in the fourth embodiment, the second signal processor 19 in the subsequent stage can perform signal processing for achieving various functions.

7. MODIFICATIONS

Note that, in the above example, an example has been described in which a light receiving tendency of the entire pixel array unit 4 is observed by collectively calculating the first event occurrence pixel number Neg1, the second event occurrence pixel number Neg2, and the event index X for the event signal Si for every first pixel G1. As a result, the sensing system 1 functions as a proximity sensor.

In addition to the above, the correlation estimation processing and the like described above can be performed for every first pixel G1. In this case, it is estimated that the first pixel G1 in which a strong correlation is estimated is a pixel in which the subject OB located near the sensing system 1 is imaged. Furthermore, since the light receiving timing of the reflected light LR in the first pixel G1 can be estimated, distance information of the subject OB can be acquired on the basis of the light receiving timing of the reflected light LR.

Therefore, since the distance to the subject OB can be calculated for every first pixel G1 included in the pixel array unit 4, the sensing system 1 can function as a distance sensor. In addition, such a sensing system 1 can output a distance image with less noise by performing correction by the signal corrector 11 described above.

Furthermore, in FIG. 4, an example in which the quantizer 16 includes two comparators has been described, but a configuration may be employed in which time division processing is performed by using one comparator.

Figure 22:
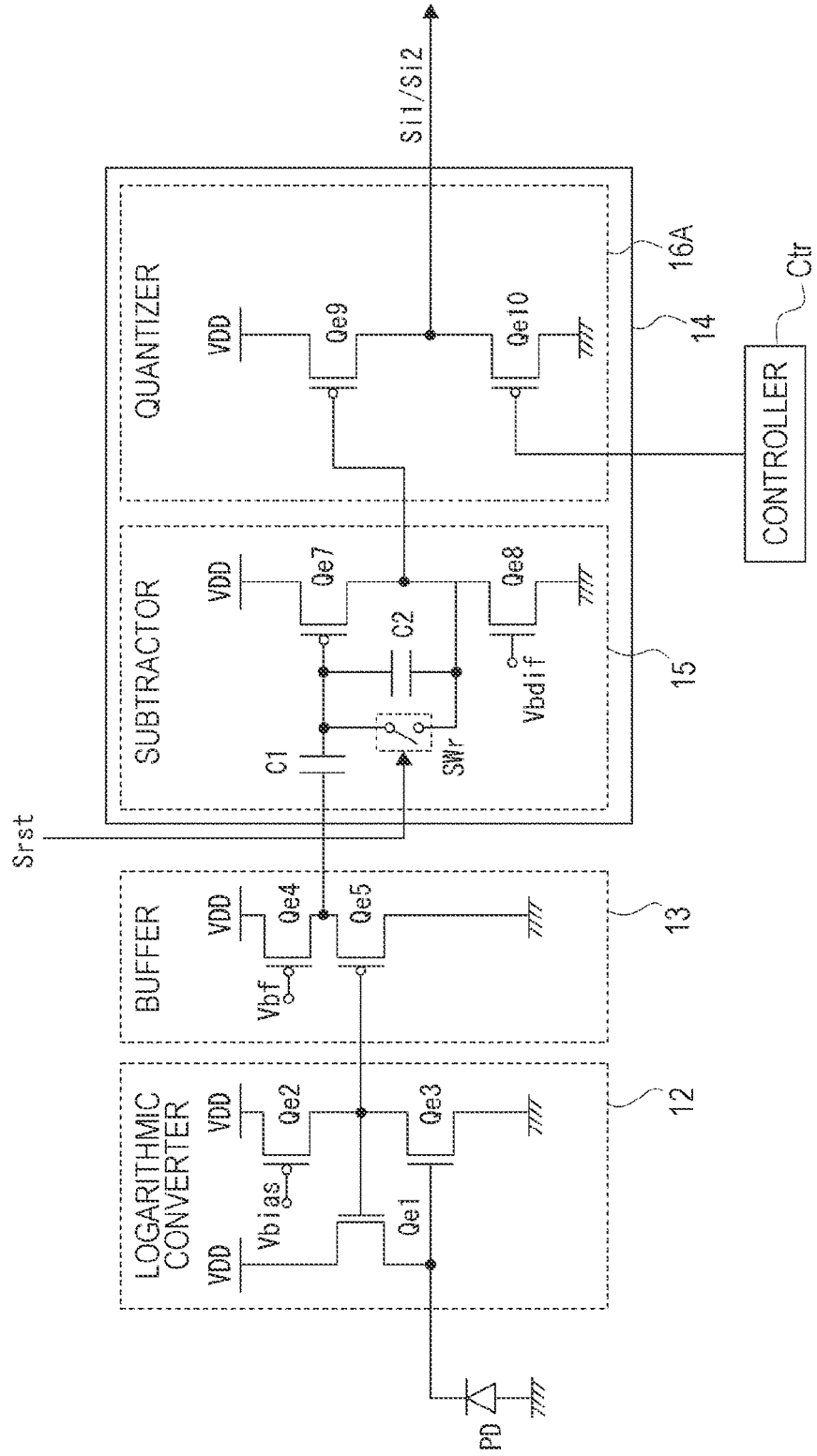
FIG. 22 is a circuit configuration of a modification of an event detection circuit.

FIG. 22 illustrates a configuration example of a quantizer 16A including one comparator. Note that the photodiode PD, the logarithmic converter 12, the buffer 13, and the subtractor 15 have configurations similar to those described above, and thus description thereof is omitted.

By using the configuration illustrated in FIG. 22, the first polarity event and the second polarity event can be detected in a time division manner.

The quantizer 16A is different from the example illustrated in FIG. 4 in that the transistor Qe11 and the transistor Qe12 are omitted. In this case, an output signal of the quantizer 16A is only one system of signal obtained at the connection point of the transistor Qe9 and the transistor Qe10.

Furthermore, the quantizer 16A is controlled on the basis of a signal output from a controller Ctr. Specifically, the controller Ctr controls a gate voltage of the transistor Qe10 in the quantizer 16A. The controller Ctrl performs control to switch the gate voltage of the transistor Qe10 between the voltage Vhigh and the voltage Vlow described above.

As understood from each of the examples described above, during a selection period of the voltage Vhigh, the first polarity event signal Si1 representing the detection result of the first polarity event is obtained in the quantizer 16A.

On the other hand, during a selection period of the voltage Vlow, the second polarity event signal Si2 indicating the detection result of the second polarity event is obtained in the quantizer 16A.

In this way, in the configuration illustrated in FIG. 22, the first polarity event and the second polarity event can be detected in a time division manner.

Note that the controller Ctr may be provided for every pixel G, or a common controller Ctr may be provided for every one of the plurality of pixels G.

8. SUMMARY

As described in each of the above embodiments and the like, the sensing system 1 (1A, 1B, 1C, 1D) includes the light emission control unit 6 that controls light emission of the light source 2 (2R, 2G, 2B) by using the predetermined light emission pattern Pt, the pixel array unit 4 (4B, 4C) in which the pixels (first pixels G1) that detect a change in the received light amount as an event and generate the event signal Si (first polarity event signal Si1, second polarity event signal Si2) indicating the presence or absence of detection of the event are two-dimensionally arranged, and the signal corrector 11 that corrects the event signal Si on the basis of the light emission pattern Pt.

The light source 2 emits light in the predetermined light emission pattern Pt, and thus, reflected light LR and noise reflected by the subject OB can be distinguished for each pixel (first pixel G1).

Therefore, noise removal and the like can be performed.

As described with reference to FIGS. 1, 7, 8, and the like, the sensing system 1 (1A, 1B, 1C, 1D) may include the determiner 7 that determines the presence or absence of occurrence of the event on the basis of the event signal Si (Si1, Si2), the counter 8 that counts the number of pixels (first pixels G1) for which the determiner 7 determines that the event has occurred as the event occurrence pixel number Neg (first event occurrence pixel number Neg1, second event occurrence pixel number Neg2), and the correlation estimator 10 that estimates the correlation between the light emission pattern Pt and the received light amount on the basis of the event occurrence pixel number Neg.

Furthermore, the signal corrector 11 may perform correction on the basis of the estimated correlation.

By estimating the correlation between the predetermined light emission pattern and the received light amount, it is possible to determine whether or not the received light is the reflected light LR of light emitted from the light source 2 (2R, 2G, 2B).

Therefore, by receiving noise or the like, it is possible to prevent erroneous detection as if an object (subject OB) in the vicinity exists even though the object does not exist.

As described with reference to each of FIGS. 5 to 9, the correlation estimator 10 in the sensing system 1 (1A, 1B, 1C, 1D) may estimate the correlation on the basis of the pixel number integral value Gi obtained by integrating the event occurrence pixel number Neg (first event occurrence pixel number Neg1, second event occurrence pixel number Neg2).

The event signal Si (first polarity event signal Si1, second polarity event signal Si2) output from the pixel (first pixel G1) is a signal that captures a change in the received light amount.

For such an event signal Si, an integral value of the event occurrence pixel number Neg becomes a signal similar to the predetermined light emission pattern Pt in a case where the subject OB having a certain size exists in a distance in which the reflected light LR reaches the pixel (first pixel G1). It is therefore possible to detect the presence of the subject OB in the vicinity with high accuracy.

As described with reference to FIGS. 5, 10, 11, and the like, the sensing system 1 (1A, 1B, 1C, 1D) may include the edge detector 9 that detects the edge of the light emission pattern Pt on the basis of the temporary varying waveform of the event occurrence pixel number Neg (first event occurrence pixel number Neg1, second event occurrence pixel number Neg2), and the correlation estimator 10 may estimate the correlation on the basis of the detected edge.

By detecting the edge corresponding to the light emission pattern Pt, it is not necessary to perform integration or the like of the event occurrence pixel number Neg.

Therefore, the processing load on the correlation estimator 10 can be reduced.

As described with reference to FIGS. 3 to 5, 10, 11, and the like, the pixel (first pixel G1) in the sensing system 1 (1A, 1B, 1C, 1D) may be able to generate, as the event signal Si, the first polarity event signal Si1 representing a change in the received light amount on the increasing side and the second polarity event signal Si2 representing a change in the received light amount on the decreasing side, the determiner 7 may determine the presence or absence of occurrence of the first event on the basis of the first polarity event signal Si1 and determine the presence or absence of occurrence of the second event on the basis of the second polarity event signal Si2, and the signal corrector 11 may perform the correction of the first polarity event signal Si1 and the second polarity event signal Si2.

Since both the first polarity event signal Si1 and the second polarity event signal Si2 can be generated, for example, the occurrence of the first polarity event corresponding to the rising edge in the predetermined light emission pattern Pt and the occurrence of the second polarity event corresponding to the falling edge in the predetermined light emission pattern can be detected.

It is therefore possible to determine the presence or absence of correlation with the predetermined light emission pattern Pt with higher accuracy for the reflected light LR of the light emitted by the predetermined light emission pattern Pt.

As described with reference to FIGS. 5, 10 to 12, and the like, the counter 8 in the sensing system 1 (1A, 1B, 1C, 1D) described above may count the number of the pixels (first pixels G1) for which the determiner 7 determines that the first event has occurred as the first event occurrence pixel number Neg1, and count the number of the pixels (first pixels G1) for which the determiner 7 determines that the second event has occurred as the second event occurrence pixel number Neg2, the correlation estimator 10 may estimate the correlation by associating the rising edge in the light emission pattern Pt with the first event occurrence pixel number Neg1 and associating the falling edge in the light emission pattern Pt with the second event occurrence pixel number Neg2, and the signal corrector 11 may perform the correction on the second event detected in a first period (for example, during a period from time t6 until the minute time Δt elapses as illustrated in FIG. 5, or the like) in which the first event occurrence pixel number Neg1 corresponding to the rising edge is counted and the first event detected in a second period (for example, during a period from time t7 until the minute time Δt elapses, during a period from time t7 to time t8, or the like) in which the second event occurrence pixel number Neg2 corresponding to the falling edge is counted.

By associating the first event occurrence pixel number Neg1 corresponding to the rising edge in the light emission pattern Pt with the second event occurrence pixel number Neg2 corresponding to the falling edge in the light emission pattern Pt, it is possible to calculate the correlation between the light emission pattern Pt and the received light amount of light received by the pixel array unit 4 (4B, 4C) on the basis of a timing of occurrence of each event or the like.

Then, in a case where the calculation result of the correlation indicates a high correlation, it is possible to determine that the second event which is a decrease event of the received light amount occurring at a timing corresponding to the rising edge and the first event which is an increase event of the received light amount occurring at a timing corresponding to the falling edge are caused by noise. Therefore, as the correction processing, it is possible to perform processing of ignoring the event generated by the noise and processing of rewriting the event generated by the noise so as to invalidate the event, and the influence of the noise can be reduced as much as possible. That is, the edge image and the like output from the sensing system can have high quality.

As described in the second embodiment with reference to FIG. 13 and the like, the notification output unit 17 that performs an output for providing notification that there is no correlation may be further provided in a case where the correlation estimated by the correlation estimator 10 indicates that there is no correlation in the sensing system 1A.

For example, the notification by the notification output unit 17 is transmitted to the processor in the subsequent stage.

As a result, for example, in a case where the sensing system 1A is used as a proximity sensor, it is not necessary to execute detailed face authentication processing or the like when the processor in the subsequent stage receives the notification processing indicating that there is no correlation, and thus, it is possible to reduce the processing load and reduce the power consumption. Furthermore, it is also possible to provide notification that there is no correlation for every pixel. For example, in a case where the sensing system 1A is used as a distance sensor, when the processor in the subsequent stage receives notification processing indicating that light received by a certain pixel (first pixel G1) has no correlation, it is not necessary to execute distance calculation processing for the pixel. As a result, the amount of calculation can be reduced. In addition, erroneous distance information is prevented from being calculated.

As described with reference to FIG. 14, 15, and the like, in the sensing system 1B, the light emission control unit 6 may control the light emission by using a different light emission pattern for every one of a plurality of wavelengths.

For example, the light source 2 (2R, 2G, 2B) can emit light of various wavelengths (for example, red light, green light, and blue light).

As a result, the event signal Si can be corrected more accurately on the basis of the light emission pattern Pt.

As described with reference to FIGS. 14, 15, and the like, the pixel array unit 4B in the sensing system 1B includes a plurality of types of pixels (red pixel G1R, green pixel G1G, and blue pixel G1B) corresponding to a plurality of wavelengths, and includes the determiner 7 that determines the presence or absence of occurrence of the event for the pixels corresponding to specific wavelengths on the basis of the event signal Si (first polarity event signal Si1, second polarity event signal Si2) generated by the pixels corresponding to the specific wavelengths (red pixel G1R, green pixel G1G, and blue pixel G1B), the counter 8 that counts the number of pixels for which the determiner 7 determines that an event has occurred as the event occurrence pixel number Neg (first event occurrence pixel number Neg1, second event occurrence pixel number Neg2) for the pixels corresponding to the specific wavelengths, and the correlation estimator 10 that calculates a correlation between the light emission pattern Ptr, Ptg, Ptb and the event occurrence pixel number Neg (first event occurrence pixel number Neg1, second event occurrence pixel number Neg2) for every one of the specific wavelengths, and the signal corrector 11 includes the event signal Si (first polarity event signal Si1, second polarity event signal Si2) generated by the pixels (red pixel G1R, green pixel G1G, and blue pixel G1B) corresponding to the specific wavelengths may be corrected on the basis of the light emission pattern Ptr, Ptg, Ptb and the correlation corresponding to the specific wavelength.

By providing the pixels corresponding to the plurality of wavelengths, the presence or absence of occurrence of the event is determined for every one of the wavelengths, and the event occurrence pixel number Neg (first event occurrence pixel number Neg1, second event occurrence pixel number Neg2) is counted.

As a result, it is possible to calculate the correlation corresponding to the complicated light emission pattern Pt in which each wavelength is mixed, and thus, noise can be selected more accurately.

As described in the third embodiment with reference to FIG. 14 and the like, in the sensing system 1B, each of the plurality of wavelengths may include a wavelength for visible light having a different color.

The specific wavelength is, for example, 700 nm for red light, 525 nm for green light, or 470 nm for blue light.

As a result, light can be emitted from the light sources 2R, 2G, and 2B so that the correlation with the light emission patterns Ptr, Ptg, and Ptb can be calculated by using pixels having general R (red), G (green), and B (blue) color filters.

As described in the third embodiment with reference to FIG. 14 and the like, in the sensing system 1B, each of the pixels (red pixel G1R, green pixel G1G, and blue pixel G1B) may include a color filter and have sensitivity to one of the plurality of wavelengths.

Thus, a pixel having a general configuration can be used.

It is therefore possible to suppress an increase in cost for constructing a pixel so as to have only sensitivity to light of a specific wavelength or light of a specific range of wavelengths.

For example, in a case where each of red light, green light, and blue light is emitted in the different light emission pattern Ptr, Ptg, Ptb, it is possible to calculate a correlation for every color in each of the first pixels G1 (Red pixel G1R, green pixel G1G, and blue pixel G1B) corresponding to each of the lights of RGB.

Therefore, the reflected light LR of the light emitted from the light sources 2R, 2G, and 2B and noise can be selected with high accuracy.

As described in the fourth embodiment with reference to FIG. 16 and the like, there may be included the first pixels G1 (red pixel G1R, green pixel G1G, and blue pixel G1B) as the pixels, the second pixels G2, G2R, G2G, and G2B that generate the gradation signal Ss indicating the intensity of the received light amount unlike the first pixel G1, and the signal processor (second signal processor 19) that performs signal processing using the corrected event signal Sic obtained by correcting the event signal Si (first polarity event signal Si1, second polarity event signal Si2) generated in the first pixel G1 by the signal corrector 11 and the gradation signal Ss generated in the second pixel G2.

Various second signal processors 19 are conceivable. For example, a signal processor that generates a color image on the basis of the gradation signal Ss and performs processing of correcting the color image by using the corrected event signal Sic is also an example.

Specifically, it is possible to execute processing of making an edge portion in a color image more conspicuous. In addition, conversely, a signal processor or the like that generates an edge image by using the corrected event signal Sic and corrects the edge image to a highly accurate edge image on the basis of contrast information obtained from the color image is also conceivable.

As described above, it is possible to achieve high definition of an image in various examples.

Furthermore, as another example, a signal processor that performs object recognition on the basis of an image generated on the basis of the gradation signal Ss and tracks the object by using the corrected event signal Sic is also conceivable.

In this case, data amount can be reduced by holding only the gradation signal Ss of a region corresponding to edge information based on the event signal Si.

As described in the fourth embodiment with reference to FIG. 17 and the like, the first pixels G1 and the second pixels G2, G2R, G2G, and G2B in the sensing system 1C may be formed on the same sensor chip.

As a result, more space can be saved than in a case where a plurality of sensor chips is configured.

Therefore, it is possible to contribute to miniaturization of the sensing system 1C.

As described in the fourth embodiment with reference to FIGS. 16 and 17, as the second pixels G2 in the sensing system 1C, a pixel having sensitivity to red light (second pixel G2R), a pixel having sensitivity to green light (second pixel G2G), and a pixel having sensitivity to blue light (second pixel G2B) may be provided.

As a result, the gradation signal Ss for every color is generated in each of the second pixels G2R, G2G, and G2B.

Therefore, various processes using the color image and the corrected event signal Sic can be performed.

As described in the fourth embodiment with reference to FIG. 17 and the like, in the sensing system 1C, the first pixel G1 may be disposed in place of some of the pixels (second pixel G2G) having sensitivity to green light in a Bayer array.

As a result, the first pixel G1 and the three types of second pixels G2R, G2G, and G2B are disposed in one pixel array unit 4C.

Therefore, the plurality of pixel array units 4 is not required to be included, and it is possible to contribute to miniaturization of the sensing system 1C.

As described in the fifth embodiment with reference to FIGS. 18, 19, and the like, the sensing system 1D may further include the light reception control unit 21 that performs light reception control in the pixel array unit 4 in accordance with the light emission pattern Pt.

For example, in a case where the non-light emission state of the light source 2 continues for a predetermined time, the reflected light LR according to the light emission pattern Pt of the light source 2 is not received. In such a case, even if an event is detected, there is a high possibility that only an event generated by noise can be detected.

Therefore, by performing the light reception control so as not to execute the processing of detecting the event and the processing of generating the event signal Si in such a case, it is possible to suppress the execution of unnecessary control and reduce the processing load and the power consumption.

As described in the fifth embodiment with reference to FIGS. 18, 19, and the like, the light reception control unit 21 may perform the light reception control so that the event is not detected in the pixel array unit 4 in a case where there is no change in the light emission state of the light source 2.

Not only in a case where the non-light emission state of the light source 2 continues for a predetermined time, but also in a case where the light emission state continues for a predetermined time, the received light amount of the reflected light LR does not change in accordance with the light emission pattern Pt of the light source 2.

Therefore, by performing light reception control so as not to detect an event in such a case, execution of unnecessary control can be suppressed, and the processing load and the power consumption can be reduced.

As described in each example, the sensing system 1 (1A, 1B, 1C, 1D) as a signal processing apparatus including the signal processor 5 includes the determiner 7 that determines the presence or absence of an event on the basis of the event signal Si (first polarity event signal Si1, second polarity event signal Si2) output from the pixels (first pixels G1) as a signal indicating whether or not a change in the received light amount has been detected as the event, the counter 8 that counts the number of pixels (first pixels G1) for which the determiner determines that the event has occurred as the event occurrence pixel number Neg (first event occurrence pixel number Neg1, second event occurrence pixel number Neg2), the correlation estimator 10 that estimates the correlation between the light emission pattern Pt determined in advance and the received light amount in the light source 2 on the basis of the event occurrence pixel number Neg, and the signal corrector 11 that corrects the event signal Si on the basis of the correlation having been estimated and the light emission pattern Pt.

With such a signal processing apparatus, the above-described various functions and effects can be obtained.

Note that, the effects herein described are merely examples and are not limited, and there may be another effect.

9. PRESENT TECHNOLOGY

Note that the present technology can also adopt the following configurations.

(1)

A sensing system including:

a light emission control unit that controls light emission of a light source by using a light emission pattern determined in advance;

a pixel array unit in which pixels that detect a change in a received light amount as an event and generate an event signal indicating presence or absence of detection of the event are two-dimensionally arranged; and a signal corrector that performs correction of the event signal on the basis of the light emission pattern.

(2)

The sensing system according to (1) described above, further including:

a determiner that determines presence or absence of occurrence of the event on the basis of the event signal;

a counter that counts a number of the pixels for which the determiner determines that the event has occurred as an event occurrence pixel number; and a correlation estimator that estimates a correlation between the light emission pattern and the received light amount on the basis of the event occurrence pixel number, in which the signal corrector performs the correction on the basis of the correlation having been estimated.

(3)

The sensing system according to (2) described above, in which the correlation estimator estimates the correlation on the basis of a pixel number integral value obtained by integrating the event occurrence pixel number.

(4)

The sensing system according to (2) or (3) described above, further including an edge detector that detects an edge of the light emission pattern on the basis of a temporary varying waveform of the event occurrence pixel number, in which the correlation estimator estimates the correlation on the basis of the edge having been detected.

(5)

The sensing system according to any one of (2) to (4) described above, in which the pixels are configured to generate, as the event signal, a first polarity event signal indicating a change in the received light amount on an increasing side and a second polarity event signal indicating a change in the received light amount on a decreasing side, the determiner determines presence or absence of occurrence of a first event on the basis of the first polarity event signal and determines presence or absence of occurrence of a second event on the basis of the second polarity event signal, and the signal corrector performs the correction of the first polarity event signal and the second polarity event signal.

(6)

The sensing system according to (5) described above, in which the counter counts a number of the pixels for which the determiner determines that the first event has occurred as the first event occurrence pixel number, and counts a number of the pixels for which the determiner determines that the second event has occurred as the second event occurrence pixel number, the correlation estimator estimates the correlation by associating a rising edge in the light emission pattern with the first event occurrence pixel number and associating a falling edge in the light emission pattern with the second event occurrence pixel number, and the signal corrector performs the correction on the second event detected in a first period in which the first event occurrence pixel number corresponding to the rising edge is counted and the first event detected in a second period in which the second event occurrence pixel number corresponding to the falling edge is counted.

(7)

The sensing system according to any one of (2) to (6) described above, further including a notification output unit that performs an output for providing notification that there is no correlation in a case where the correlation estimated by the correlation estimator indicates that there is no correlation.

(8)

The sensing system according to any one of (1) to (7) described above, in which the light emission control unit controls the light emission by using a different light emission pattern for every one of a plurality of wavelengths.

(9)

The sensing system according to (8) described above, in which the pixel array unit is provided with a plurality of types of the pixels corresponding to every one of the plurality of wavelengths, the sensing system includes a determiner that determines the presence or absence of occurrence of the event for the pixels corresponding to specific wavelengths on the basis of the event signal generated by the pixels corresponding to the specific wavelengths, a counter that counts the number of the pixels for which the determiner determines that the event has occurred as an event occurrence pixel number for the pixels corresponding to the specific wavelengths, and a correlation estimator that calculates a correlation between the light emission pattern and the event occurrence pixel number for every one of the specific wavelengths, and the signal corrector corrects the event signal generated by the pixels corresponding to the specific wavelengths on the basis of the light emission pattern and the correlation corresponding to the specific wavelengths.

(10)

The sensing system according to (8) or (9) described above, in which each of the plurality of wavelengths includes a wavelength for visible light having a different color.

(11)

The sensing system according to any one of (8) to (10) described above, in which each of the pixels includes a color filter and has sensitivity to one of the plurality of wavelengths.

(12)

The sensing system according to any one of (1) to (11) described above, further including:

a first pixel as the pixel;

a second pixel that is different from the first pixel and generates a gradation signal representing intensity of a received light amount; and a signal processor that performs signal processing by using the gradation signal generated in the second pixel and a corrected event signal obtained by correcting the event signal generated in the first pixel by the signal corrector.

(13)

The sensing system according to (12) described above, in which the first pixel and the second pixel are disposed on the same sensor chip.

(14)

The sensing system according to (12) or (13) described above, in which a pixel having sensitivity to red light, a pixel having sensitivity to green light, and a pixel having sensitivity to blue light are provided as the second pixel.

(15)

The sensing system according to (14) described above, in which the first pixel is disposed in place of some of the pixels having sensitivity to green light in a Bayer array.

(16)

The sensing system according to any one of (1) to (15) described above, further including a light reception control unit that performs light reception control in the pixel array unit in accordance with the light emission pattern.

(17)

The sensing system according to (16) described above, in which the light reception control unit performs the light reception control so that the event is not detected in the pixel array unit in a case where there is no change in a light emission state of the light source.

(18)

A signal processing apparatus including:

a determiner that determines presence or absence of an event on the basis of an event signal output from a pixel as a signal indicating whether or not a change in a received light amount has been detected as the event;

a counter that counts a number of the pixels for which the determiner determines that the event has occurred as an event occurrence pixel number;

a correlation estimator that estimates a correlation between a light emission pattern determined in advance and the received light amount in a light source on the basis of the event occurrence pixel number; and a signal corrector that corrects the event signal on the basis of the correlation having been estimated and the light emission pattern.

REFERENCE SIGNS LIST 1, 1A, 1B, 1C, 1D Sensing system
2, 2R, 2G, 2B Light source
4, 4B, 4C Pixel array unit
6 Light emission control unit
7 Determiner
8 Counter
9 Edge detector
10 Correlation estimator
11 Signal corrector
17 Notification output unit
19 Second signal processor
21 Light reception control unit
LR Reflected light
Pt, Ptr, Ptg, Ptb Light emission pattern
G Pixel
G1 First pixel
G1R Red pixel
G1G Green pixel
G1B Blue pixel
G2, G2R, G2G, G2B Second pixel Si Event signal
Si1, Si1r, Si1g, Si1b First polarity event signal
Si2, Si2r, Si2g, Si2b Second polarity event signal
Sic Corrected event signal
Ss Gradation signal
Neg Event occurrence pixel number
Neg1 First event occurrence pixel number
Neg2 Second event occurrence pixel number

The invention claimed is:

1. A sensing system, comprising:
a light emission control unit configured to control light emission of a light source based on a specific light emission pattern;
a pixel array unit that includes pixels in two-dimensional arrangement, wherein the pixels are configured to:
detect a change in a received light amount as an event, and
generate an event signal indicating presence or absence of detection of the event; and
a signal corrector configured to perform correction of the event signal based on the specific light emission pattern.

2. The sensing system according to claim 1, further comprising:
a determiner configured to determine presence or absence of occurrence of the event based on the event signal;
a counter configured to count a number of the pixels for which the determiner determines that the event has occurred as an event occurrence pixel number; and
a correlation estimator configured to estimate a correlation between the specific light emission pattern and the received light amount based on the event occurrence pixel number, wherein
the signal corrector is further configured to perform the correction based on the estimated correlation.

3. The sensing system according to claim 2, wherein
the correlation estimator is further configured to estimate the correlation based on a pixel number integral value obtained by integrating the event occurrence pixel number.

4. The sensing system according to claim 2, further comprising
an edge detector configured to detect an edge of the specific light emission pattern based on a temporary varying waveform of the event occurrence pixel number, wherein
the correlation estimator is further configured to estimate the correlation based on the detected edge.

5. The sensing system according to claim 2, wherein
the pixels are configured to generate, as the event signal, a first polarity event signal that indicates a change in the received light amount on an increasing side and a second polarity event signal that indicates a change in the received light amount on a decreasing side,
the determiner is further configured to:
determine presence or absence of occurrence of a first event based on the first polarity event signal, and
determine presence or absence of occurrence of a second event based on the second polarity event signal, and
the signal corrector is further configured to perform the correction of the first polarity event signal and the second polarity event signal.

6. The sensing system according to claim 5, wherein
the counter is further configured to:
count a number of the pixels for which the determiner determines that the first event has occurred as a first event occurrence pixel number, and
count a number of the pixels for which the determiner determines that the second event has occurred as a second event occurrence pixel number,
the correlation estimator is further configured to estimate the correlation based on association of a rising edge in the specific light emission pattern with the first event occurrence pixel number and association of a falling edge in the specific light emission pattern with the second event occurrence pixel number, and
the signal corrector is further configured to perform the correction on the second event in a first period in which the first event occurrence pixel number corresponding to the rising edge is counted and the first event in a second period in which the second event occurrence pixel number corresponding to the falling edge is counted.

7. The sensing system according to claim 2, further comprising:
a notification output unit configured to perform, based on determination that the estimated correlation indicates that there is no correlation, an output to provide notification that indicates that there is no correlation.

8. The sensing system according to claim 1, wherein
the light emission control unit is further configured to control the light emission based on a different light emission pattern for each of a plurality of wavelengths.

9. The sensing system according to claim 8, wherein
the pixel array unit is with a plurality of types of the pixels corresponding to every one of the plurality of wavelengths,
the sensing system includes:
a determiner configured to determine the presence or absence of occurrence of the event for the pixels corresponding to specific wavelengths based on the event signal generated by the pixels corresponding to the specific wavelengths,
a counter configured to count a number of the pixels for which the determiner determines that the event has occurred as an event occurrence pixel number for the pixels corresponding to the specific wavelengths, and
a correlation estimator configured to calculate a correlation between the specific light emission pattern and the event occurrence pixel number for every one of the specific wavelengths, and
the signal corrector is further configured to correct the event signal generated by the pixels corresponding to the specific wavelengths based on the specific light emission pattern and the correlation corresponding to the specific wavelengths.

10. The sensing system according to claim 8, wherein
each of the plurality of wavelengths includes a wavelength for visible light having a different color.

11. The sensing system according to claim 8, wherein
each of the pixels includes a color filter and has sensitivity to one of the plurality of wavelengths.

12. The sensing system according to claim 1, further comprising:
a first pixel of the pixels;
a second pixel of the pixels that is different from the first pixel and generates a gradation signal that represents intensity of a received light amount; and
a signal processor configured to perform signal processing based on the generated gradation signal and a corrected event signal obtained by correcting the event signal generated in the first pixel by the signal corrector.

13. The sensing system according to claim 12, wherein the first pixel and the second pixel are on a same sensor chip.

14. The sensing system according to claim 12, wherein one of a pixel having sensitivity to red light, a pixel having sensitivity to green light, or a pixel having sensitivity to blue light is the second pixel.

15. The sensing system according to claim 14, wherein the first pixel is in place of some of the pixels having sensitivity to green light in a Bayer array.

16. The sensing system according to claim 1, further comprising
a light reception control unit configured to perform light reception control in the pixel array unit based on the specific light emission pattern.

17. The sensing system according to claim 16, wherein the light reception control unit is further configured to perform the light reception control, based on determination there is no change in a light emission state of the light source, to not detect the event in the pixel array unit.

18. A signal processing apparatus, comprising:
a determiner configured to determine presence or absence of an event based on an event signal output from a pixel, wherein the event signal indicates whether or not a change in a received light amount has been detected as the event;
a counter configured to count a number of the pixels for which the determiner determines that the event has occurred as an event occurrence pixel number;
a correlation estimator configured to estimate a correlation between a specific light emission pattern and the received light amount in a light source based on the event occurrence pixel number; and
a signal corrector configured to correct the event signal based on the estimated correlation and the specific light emission pattern.

* * * * *